US011553374B2

(12) United States Patent
Huang et al.

(10) Patent No.: US 11,553,374 B2
(45) Date of Patent: Jan. 10, 2023

(54) IDENTIFYING A HYBRID AUTOMATIC REPEAT REQUEST MODE

(71) Applicant: QUALCOMM Incorporated, San Diego, CA (US)

(72) Inventors: Yi Huang, San Diego, CA (US); Wei Yang, San Diego, CA (US); Seyedkianoush Hosseini, San Diego, CA (US); Wanshi Chen, San Diego, CA (US); Peter Gaal, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/156,404

(22) Filed: Jan. 22, 2021

(65) Prior Publication Data

US 2021/0226737 A1 Jul. 22, 2021

Related U.S. Application Data

(60) Provisional application No. 62/976,310, filed on Feb. 13, 2020, provisional application No. 62/964,514, filed on Jan. 22, 2020.

(51) Int. Cl.
*H04B 7/06* (2006.01)
*H04B 17/24* (2015.01)
(Continued)

(52) U.S. Cl.
CPC .......... *H04W 28/04* (2013.01); *H04B 7/0626* (2013.01); *H04B 17/24* (2015.01);
(Continued)

(58) Field of Classification Search
CPC ............. H04B 7/02–12; H04B 17/0082–3913; H04L 1/0001–248; H04L 5/0001–26; H04W 8/22–245; H04W 24/02–10; H04W 28/02–26; H04W 36/0005–385; H04W 48/02–20; H04W 52/02–60;
(Continued)

(56) References Cited

U.S. PATENT DOCUMENTS

2008/0310338 A1* 12/2008 Charpenter ........... H04L 1/1671
2015/0365925 A1* 12/2015 Fu ......................... H04L 1/0026
(Continued)

*Primary Examiner* — Timothy J Weidner
(74) *Attorney, Agent, or Firm* — Holland & Hart LLP

(57) ABSTRACT

Methods, systems, and devices for wireless communications are described. A communications device may receive a downlink control message that supports indicating multiple modes for reporting hybrid automatic repeat request feedback, including a first mode for reporting hybrid automatic repeat request feedback and channel information according to a bundled configuration and a second mode for reporting hybrid automatic repeat request feedback according to a standalone configuration. The communications device may use the downlink control message to determine a mode for transmitting hybrid automatic repeat request feedback. The communications device may also transmit either bundled hybrid automatic repeat request feedback and channel information or standalone hybrid automatic repeat request according to the determined mode.

28 Claims, 14 Drawing Sheets

(51) Int. Cl.
| | |
|---|---|
| H04L 1/00 | (2006.01) |
| H04L 1/16 | (2006.01) |
| H04L 1/18 | (2006.01) |
| H04L 5/00 | (2006.01) |
| H04W 24/10 | (2009.01) |
| H04W 28/04 | (2009.01) |
| H04W 52/38 | (2009.01) |
| H04W 72/12 | (2009.01) |
| H04W 84/02 | (2009.01) |
| H04W 88/02 | (2009.01) |
| H04W 88/08 | (2009.01) |
| H04W 92/02 | (2009.01) |
| H04W 92/10 | (2009.01) |

(52) U.S. Cl.
CPC .......... *H04L 1/0003* (2013.01); *H04L 1/0025* (2013.01); *H04L 1/0026* (2013.01); *H04L 1/1671* (2013.01); *H04L 1/1819* (2013.01); *H04L 1/1825* (2013.01); *H04L 1/1864* (2013.01); *H04L 1/1896* (2013.01); *H04L 5/0055* (2013.01); *H04L 5/0057* (2013.01); *H04W 24/10* (2013.01); *H04W 52/38* (2013.01); *H04W 72/1289* (2013.01); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
CPC ............... H04W 72/005–14; H04W 76/10–50; H04W 84/02–16; H04W 88/02–12; H04W 92/02; H04W 92/04; H04W 92/10; Y02D 30/70
See application file for complete search history.

(56) References Cited

U.S. PATENT DOCUMENTS

| | | | |
|---|---|---|---|
| 2019/0123881 A1* | 4/2019 | Lee | ........................ H04L 1/1861 |
| 2022/0014313 A1* | 1/2022 | Elshafie | ................ H04L 1/1864 |

* cited by examiner

IDENTIFYING A HYBRID AUTOMATIC REPEAT REQUEST MODE

CROSS REFERENCE

The present application for patent claims the benefit of U.S. Provisional Patent Application No. 62/964,514 by HUANG et al., entitled "IDENTIFYING A HYBRID AUTOMATIC REPEAT REQUEST MODE," filed Jan. 22, 2020, and U.S. Provisional Patent Application No. 62/976,310 by HUANG et al., entitled "IDENTIFYING A HYBRID AUTOMATIC REPEAT REQUEST MODE," filed Feb. 13, 2020, each of which are assigned to the assignee hereof and expressly incorporated by reference herein.

FIELD OF TECHNOLOGY

The following relates generally to wireless communications and more specifically to identifying a hybrid automatic repeat request (HARQ) mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station communicates with a UE by transmitting control information and user data over a wireless channel between the base station and UE. To increase a reliability of subsequent transmissions from a base station to a UE, the UE may report feedback indicating whether a prior data transmission was successfully received and/or decoded by the UE. This feedback may be referred to as HARQ feedback.

SUMMARY

The described techniques relate to improved methods, systems, devices, and apparatuses that support identifying a hybrid automatic repeat request (HARQ) mode. Multiple modes for reporting HARQ feedback may be configurable at a communications device. The modes for reporting HARQ feedback may include modes for reporting standalone HARQ feedback and modes for reporting HARQ feedback bundled with channel information. A communications device may receive a downlink control message that is capable of indicating one of multiple modes for reporting HARQ feedback. In some examples, the downlink control message may indicate a first mode for reporting HARQ feedback and channel information according to a bundling configuration and a second mode for reporting HARQ feedback according to a standalone configuration. After determining a mode for reporting HARQ feedback, the communications device may transmit HARQ feedback and channel information according to the determined mode.

In some cases, transmitting HARQ feedback and channel information according to a mode for reporting HARQ feedback and channel information includes transmitting HARQ feedback on its own—e.g., if a mode directs the transmission of standalone HARQ feedback when a downlink data message is successfully decoded. In some cases, transmitting HARQ feedback and channel information according to a mode for reporting HARQ feedback and channel information includes transmitting HARQ feedback and channel information—e.g., if a mode directs the transmission of HARQ feedback and channel information when a downlink data message is unsuccessfully received and/or decoded.

A method of wireless communications at a user equipment (UE) is described. The method may include receiving a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determining to use the first mode for transmitting the HARQ feedback and the channel information based on the downlink control message, and transmitting the HARQ feedback and the channel information according to the first mode.

An apparatus for wireless communications at a UE is described. The apparatus may include a processor, memory coupled with the processor, and instructions stored in the memory. The instructions may be executable by the processor to cause the apparatus to receive a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determine to use the first mode for transmitting the HARQ feedback and the channel information based on the downlink control message, and transmit the HARQ feedback and the channel information according to the first mode.

Another apparatus for wireless communications at a UE is described. The apparatus may include means for receiving a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determining to use the first mode for transmitting the HARQ feedback and the channel information based on the downlink control message, and transmitting the HARQ feedback and the channel information according to the first mode.

A non-transitory computer-readable medium storing code for wireless communications at a UE is described. The code may include instructions executable by a processor to receive a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a stand-alone configuration, determine to use the first mode for transmitting the HARQ feedback and the channel information based on the downlink control message, and transmit the HARQ feedback and the channel information according to the first mode.

Some examples of the method, apparatuses, and non-transitory computer-readable medium described herein may further include operations, features, means, or instructions for bundling the HARQ feedback with the channel information based on determining to use the first mode, where the HARQ feedback and the channel information may be transmitted after the bundling.

Some examples of the method, apparatuses, and non-transitory computer-readable medium described herein may further include operations, features, means, or instructions for identifying a channel state information reference signal resource based at least in part on an indication of the channel state information reference signal resource included in the downlink control message, wherein the channel information is determined based at least in part on the channel state information reference signal resource.

Some examples of the method, apparatuses, and non-transitory computer-readable medium described herein may further include operations, features, means, or instructions for identifying an uplink control resource based on determining to use the first mode, where the HARQ feedback and the channel information may be transmitted in the uplink control resource.

Some examples of the method, apparatuses, and non-transitory computer-readable medium described herein may further include operations, features, means, or instructions for identifying a set of uplink control resources based on determining to use the first mode, where the HARQ feedback may be transmitted in a first uplink control resource of the set of uplink control resources and the channel information may be transmitted in a second uplink control resource of the set of uplink control resources.

In some examples of the method, apparatuses, and non-transitory computer-readable medium described herein, the downlink control message includes an indicator that triggers the UE to report the channel information, an indication of a timing for transmitting the channel information, an indication of an uplink control resource for transmitting the channel information, an indication of a power for transmitting the channel information, or any combination thereof.

Some examples of the method, apparatuses, and non-transitory computer-readable medium described herein may further include operations, features, means, or instructions for receiving a downlink data transmission based on the downlink control message, determining that a decoding of the downlink data transmission was successful, and refraining from bundling the HARQ feedback with the channel information based on the decoding being successful, where transmitting the HARQ feedback and the channel information includes transmitting the HARQ feedback without the channel information.

Some examples of the method, apparatuses, and non-transitory computer-readable medium described herein may further include operations, features, means, or instructions for identifying a set of uplink control resources based on determining to use the first mode, where a first uplink control resource of the set of uplink control resources may be configured for transmissions of HARQ feedback and a second uplink control resource of the set of uplink control resources may be configured for transmissions of bundled HARQ feedback and channel information.

Some examples of the method, apparatuses, and non-transitory computer-readable medium described herein may further include operations, features, means, or instructions for receiving a downlink data transmission based on the downlink control message, determining that a decoding of the downlink data transmission was unsuccessful, and bundling the HARQ feedback with the channel information based on the decoding being unsuccessful.

Some examples of the method, apparatuses, and non-transitory computer-readable medium described herein may further include operations, features, means, or instructions for identifying a set of uplink control resources based on determining to use the first mode, where a first uplink control resource of the set of uplink control resources may be configured for transmissions of HARQ feedback and a second uplink control resource of the set of uplink control resources may be configured for transmissions of bundled HARQ feedback and channel information.

In some examples of the method, apparatuses, and non-transitory computer-readable medium described herein, the HARQ feedback and channel information may be transmitted over the second uplink control resource based on the decoding being unsuccessful.

Some examples of the method, apparatuses, and non-transitory computer-readable medium described herein may further include operations, features, means, or instructions for selecting, based on determining to use the first mode, one of the set of values based on a decoding of a data transmission scheduled by the downlink control message and a measurement of a channel condition, where the transmitted HARQ feedback and the transmitted channel information includes the selected one of the set of values.

Some examples of the method, apparatuses, and non-transitory computer-readable medium described herein may further include operations, features, means, or instructions for determining a first value of a channel quality indicator, wherein the data transmission is based at least in part on the first value; failing to decode the data transmission; and determining a second value of the channel quality indicator, wherein the one of the plurality of values is selected based at least in part on a difference between the first value and the second value.

In some examples of the method, apparatuses, and non-transitory computer-readable medium described herein, the second value of the channel quality indicator is based at least in part on a signal strength for the data transmission.

In some examples of the method, apparatuses, and non-transitory computer-readable medium described herein, a first value of the set of values corresponds to a successful decoding of the data transmission, a second value of the set of values corresponds to an unsuccessful decoding of the data transmission and a first channel measurement, a third value of the set of values corresponds to the unsuccessful decoding of the data transmission and a second channel measurement, and a fourth value of the set of values corresponds to the unsuccessful decoding of the data transmission and a third channel measurement.

In some examples of the method, apparatuses, and non-transitory computer-readable medium described herein, the second value corresponds to a missed downlink control message.

In some examples of the method, apparatuses, and non-transitory computer-readable medium described herein, a first value of the set of values corresponds to an unsuccessful decoding of the data transmission and a first channel measurement, a second value of the set of values corresponds to the unsuccessful decoding of the data transmission and a second channel measurement, a third value of the set of values corresponds to the unsuccessful decoding of the data transmission and a third channel measurement, and a fourth value of the set of values corresponds to the unsuccessful decoding of the data transmission and a fourth channel measurement.

In some examples of the method, apparatuses, and non-transitory computer-readable medium described herein, the first value corresponds to a missed downlink control message.

In some examples of the method, apparatuses, and non-transitory computer-readable medium described herein, a first value of the plurality of values corresponds to a successful decoding of the data transmission; a second value of the plurality of values corresponds to an unsuccessful decoding of the data transmission; and a third value of the plurality of values corresponds to a missed downlink control message. In some examples of the method, apparatuses, and non-transitory computer-readable medium described herein, a fourth value of the plurality of values corresponds to the unsuccessful decoding of the data transmission and a first channel measurement.

In some examples of the method, apparatuses, and non-transitory computer-readable medium described herein, the determining may include operations, features, means, or instructions for decoding an indicator field in the downlink control message, the indicator field including an indication of the first mode, and activating the first mode based on the indication.

Some examples of the method, apparatuses, and non-transitory computer-readable medium described herein may further include operations, features, means, or instructions for receiving a second downlink control message that supports indicating one of the set of modes for reporting HARQ feedback, decoding the indicator field in the second downlink control message, the indicator field including a second indication of the second mode, activating the second mode based on the second indication, and transmitting second HARQ feedback according to the second mode.

In some examples of the method, apparatuses, and non-transitory computer-readable medium described herein, the determining may include operations, features, means, or instructions for identifying a format of the downlink control message, determining that the format of the downlink control message corresponds to the first mode, and activating the first mode based on the format of the downlink control message.

Some examples of the method, apparatuses, and non-transitory computer-readable medium described herein may further include operations, features, means, or instructions for receiving a second downlink control message that supports indicating one of the set of modes for reporting HARQ feedback, determining that a second format of the second downlink control message corresponds to the second mode, activating the second mode based on the format of the second downlink control message, and transmitting second HARQ feedback according to the second mode.

Some examples of the method, apparatuses, and non-transitory computer-readable medium described herein may further include operations, features, means, or instructions for receiving a radio resource control message; decoding an indicator field in the radio resource control message, the indicator field comprising an indication of the first mode; and activating the first mode based at least in part on the indication.

A method of wireless communications at a base station is described. The method may include transmitting a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determining to use the first mode for receiving the HARQ feedback and the channel information based on the downlink control message, and receiving the HARQ feedback and the channel information according to the first mode.

An apparatus for wireless communications at a base station is described. The apparatus may include a processor, memory coupled with the processor, and instructions stored in the memory. The instructions may be executable by the processor to cause the apparatus to transmit a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determine to use the first mode for receiving the HARQ feedback and the channel information based on the downlink control message, and receive the HARQ feedback and the channel information according to the first mode.

Another apparatus for wireless communications at a base station is described. The apparatus may include means for transmitting a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determining to use the first mode for receiving the HARQ feedback and the channel information based on the downlink control message, and receiving the HARQ feedback and the channel information according to the first mode.

A non-transitory computer-readable medium storing code for wireless communications at a base station is described. The code may include instructions executable by a processor to transmit a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determine to use the first mode for receiving the HARQ feedback and the channel information based on the downlink control message, and receive the HARQ feedback and the channel information according to the first mode.

Some examples of the method, apparatuses, and non-transitory computer-readable medium described herein may further include operations, features, means, or instructions for scheduling an uplink control resource based on determining to use the first mode, where the HARQ feedback and channel information may be received in the uplink control resource.

Some examples of the method, apparatuses, and non-transitory computer-readable medium described herein may further include operations, features, means, or instructions for scheduling a set of uplink control resources based on determining to use the first mode, where the HARQ feedback may be received in a first uplink control resource of the set of uplink control resources and the channel information may be received in a second uplink control resource of the set of uplink control resources that occurs after the first uplink control resource.

In some examples of the method, apparatuses, and non-transitory computer-readable medium described herein, the downlink control message includes an indicator that triggers a UE to report the channel information, an indication of a timing for the UE to transmit the channel information, an indication of an uplink control resource for transmitting the channel information, an indication of a power for transmitting the channel information, or any combination thereof.

Some examples of the method, apparatuses, and non-transitory computer-readable medium described herein may further include operations, features, means, or instructions for scheduling a set of uplink control resources based on determining to use the first mode, where a first uplink control resource of the set of uplink control resources may be configured for transmissions of HARQ feedback and a second uplink control resource of the set of uplink control resources may be configured for transmissions of bundled HARQ feedback and channel information.

Some examples of the method, apparatuses, and non-transitory computer-readable medium described herein may further include operations, features, means, or instructions for transmitting downlink data based on the downlink control message, and receiving the HARQ feedback without the channel information over the first uplink control resource based on a successful decoding of the downlink data.

Some examples of the method, apparatuses, and non-transitory computer-readable medium described herein may further include operations, features, means, or instructions for transmitting downlink data based on the downlink control message, and receiving the HARQ feedback and the channel information over the first uplink control resource based on an unsuccessful decoding of the downlink data.

Some examples of the method, apparatuses, and non-transitory computer-readable medium described herein may further include operations, features, means, or instructions for receiving, based on determining to use the first mode, one of the set of values based on a decoding of a data transmission scheduled by the downlink control message and a measurement of a channel condition, where the received HARQ feedback and the received channel information includes the one of the set of values.

Some examples of the method, apparatuses, and non-transitory computer-readable medium described herein may further include operations, features, means, or instructions for setting an indicator field in the downlink control message to indicate the first mode, and activating the first mode based on the indication.

Some examples of the method, apparatuses, and non-transitory computer-readable medium described herein may further include operations, features, means, or instructions for selecting a format of the downlink control message from a set of formats, where the format corresponds to the first mode, and activating the first mode based on selecting the format of the downlink control message.

DETAILED DESCRIPTION

Figure 1:
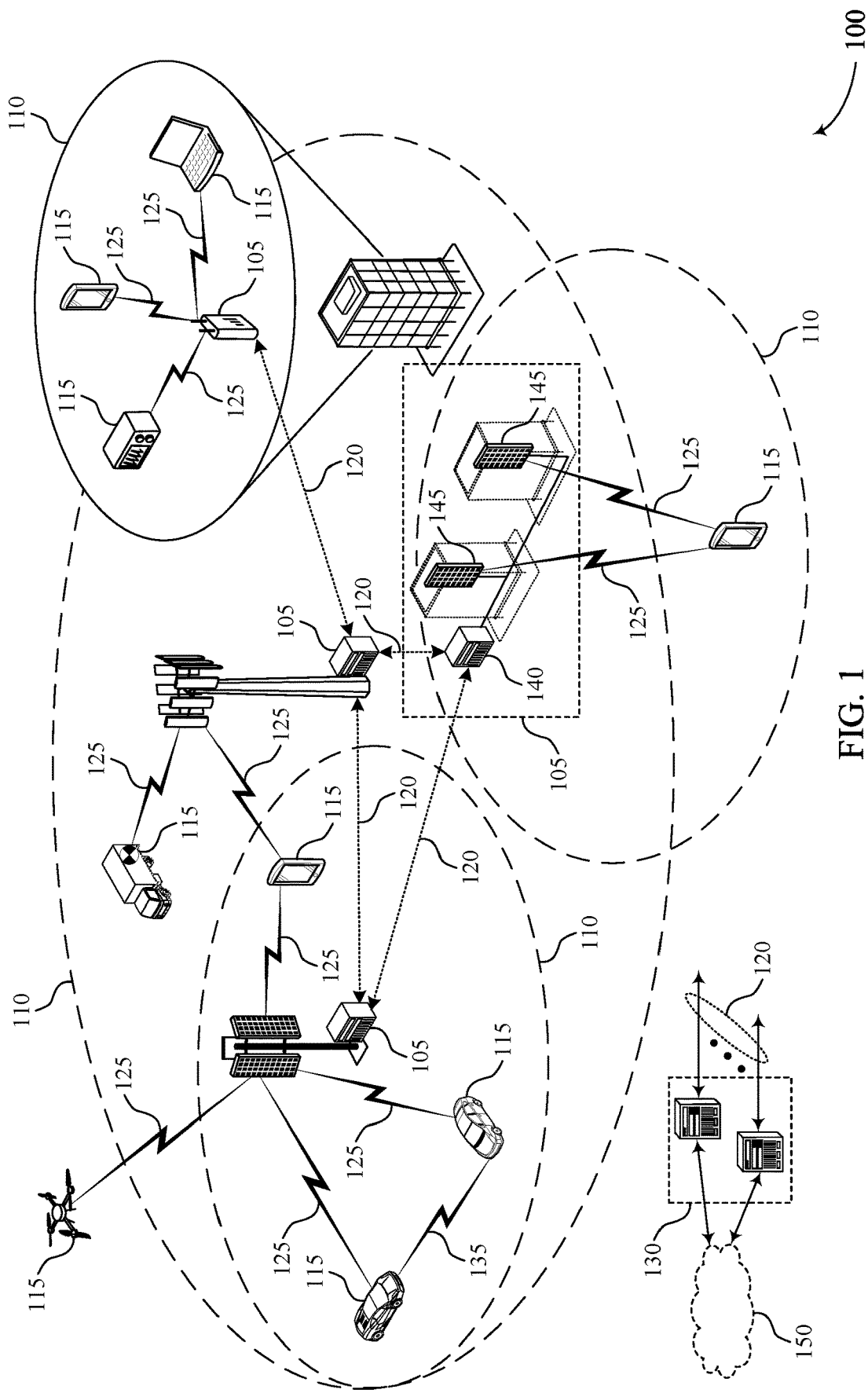
FIG. 1 illustrates an example of a system for wireless communications that supports identifying a hybrid automatic repeat request (HARQ) mode in accordance with aspects of the present disclosure.

A wireless communications system may be configured to support the reporting of channel information to a transmitting device—e.g., to enable the transmitting device to adapt to changing channel conditions and increase a reliability of transmissions. A wireless communications system may also be configured to support the reporting of hybrid automatic repeat request (HARQ) feedback—e.g., to enable the transmitting device to retransmit failed transmissions and increase a reliability of transmissions. In some cases, a transmitting device may retransmit data using adapted transmission parameters after receiving HARQ feedback. In some examples, the adapted transmission parameters may be based on a latest set of channel measurement performed by the transmitting device.

To increase a reliability of retransmissions, a receiving device may be configured to transmit channel information with HARQ feedback. To support the combined transmission of channel information and HARQ feedback, enhanced reporting modes and signaling techniques that support the enhanced reporting modes may be introduced. In some examples, a first reporting mode may configure a receiving device to transmit HARQ feedback and channel information in a same uplink control resource. In some examples, a second reporting mode may configure a receiving device to transmit HARQ feedback in a first uplink control resource and channel information in a second uplink control resource. In some examples, a third reporting mode may configure a receiving device to transmit HARQ feedback in a first uplink control resource when the receiving device successfully decodes a downlink transmission and to transmit HARQ feedback and channel information in a second uplink control resource when the receiving device fails to decode the downlink transmission. In some examples, a fourth reporting mode may configure a receiving device to transmit multi-bit HARQ feedback that serves a dual purpose of indicating a success of a downlink transmission and of indicating channel information—e.g., HARQ feedback having the value "01" may indicate that the receiving device failed to decode a downlink transmission and that a channel quality is at or below a threshold value.

To support the concurrent operation of one or more of the above reporting modes, enhanced signaling may be introduced. In some examples, a downlink control message is used to trigger the reporting of HARQ feedback and channel information and/or to indicate a configured reporting mode. In some examples, the downlink control message includes an explicit indication of the reporting mode—e.g., an indication field in the downlink control message indicates one of the reporting modes. In some examples, the downlink control message includes an implicit indication of the reporting mode—e.g., a receiving device determines the configured reporting mode based on decoding the downlink control message according to one of multiple message formats that each correspond to different reporting modes. In some examples, the downlink control message includes both an explicit and implicit indication of the reporting mode—e.g., a receiving device determines that a reporting mode for transmitting bundled HARQ feedback and channel information is configured based on decoding the downlink control message according to a corresponding message format and determines a particular reporting mode for transmitting bundled HARQ feedback and channel information based on an indicator included in the downlink control message.

Aspects of the disclosure are initially described in the context of wireless communications systems. Resource maps are also used to illustrate a configuration of communications resources that support different HARQ modes. And an exemplary process that supports identifying a HARQ mode are described. Aspects of the disclosure are further illustrated by and described with reference to apparatus diagrams, system diagrams, and flowcharts that relate to identifying a HARQ mode.

FIG. 1 illustrates an example of a wireless communications system 100 that supports identifying a HARQ mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To increase a reliability of communications between a base station 105 and a UE 115, a wireless communications system 100 may configure a base station 105 and a UE 115 to activate HARQ operation for communications between a base station 105 and a UE 115. After activating HARQ operation, a UE 115 may indicate to a base station 105 whether a transport block (or code block group) received from the base station 105 was successfully decoded. To indicate whether a decoding was successful, the UE 115 may transmit either a positive acknowledgment (ACK) message—to indicate a successful decoding—or a negative ACK (NACK) message—to indicate an unsuccessful decoding—for the transport block (or code block group). The acknowledgement information reported by the UE 115 may be referred to as "HARQ feedback."

If a communication is not successfully decoded by a UE 115, a base station 105 may transmit to the UE 115, in a subsequent transport block (or code block group), the same data that was not delivered in a previous, failed communication. This subsequent transmission may also be referred to as a "retransmission." In some cases, the base station 105 may perform the subsequent transmission using modified transmission parameters that increase the likelihood of a successful decoding at the UE 115—e.g., by transmitting with a higher transmission power, using a different modulation and coding scheme (MCS), or the like.

In some cases, a base station 105 may use a downlink control information (DCI) message to indicate a location of (e.g., a set of time and frequency resources for) a transport block (or code block group) that occur during physical downlink shared channel (PDSCH) resources and to indicate a location of uplink control channel resources for a UE 115 to transmit HARQ feedback relative to the location of the one or more transport blocks (or code block groups). In some examples, a timing between the transmission of the DCI message and the transmission of a transport block may be equivalent to a value K0, and a timing between the transmission of the transport block and the uplink control resources may be equivalent to a value K1. In some cases, values for K0 and K1 are included in the DCI message. In other cases, one or both of the values for K0 and K1 are set by the network (e.g., indicated in RRC signaling).

Additionally, or alternatively, to increase the reliability of communication between a base station 105 and UE 115, a wireless communications system 100 may configure a UE 115 to report information (e.g., channel quality indicator (CQI), channel state information (CSI), precoding matrix indicator (PMI), rank indicator (RI), CSI-reference signal indicator (CRI), etc.) about a channel (or "channel information") between the UE 115 and the base station 105. A base station 105 may use received channel information to adapt transmission parameters used for subsequent transmissions, where the adapted transmission parameters may be favorable for the current conditions of the channel relative to the unadjusted transmission parameters. In some cases, a UE 115 reports channel information on a periodic basis. In other cases, a UE 115 reports channel information after receiving control signaling (e.g., an aperiodic CSI trigger) triggering the UE 115 to report channel information.

In some cases, a base station 105 that has activated HARQ operation may use received information about a channel to adapt the transmission parameters used for a retransmission, increasing the likelihood of the success for the retransmission. That said, the reporting of HARQ feedback and the reporting of channel information may be independent of one another, and in some cases, the base station 105 may not have access to recent (e.g., up-to-date) channel information before adapting transmission parameters for a retransmission. In some cases, channel information is reported less frequently than HARQ feedback. And in some cases, a processing time for generating channel information is longer than a processing time for generating HARQ feedback.

To enhance HARQ operation, a base station 105 and UE 115 may be configured to support the transmission of combined (or bundled) HARQ feedback and channel information. By combining the transmission of HARQ feedback and channel information, a UE 115 may transmit channel information that is coupled with HARQ feedback (e.g., that is sent in a same physical uplink control channel (PUCCH) resource or that is sent in a subsequent PUCCH resource than the HARQ feedback), and a base station 105 may expect to receive both HARQ feedback and channel information. Thus, a base station 105 may adapt transmission parameters for retransmissions based on recent channel information.

Enhanced operating modes (or "modes") for the concurrent reporting of HARQ feedback and channel information may be introduced. Enhanced signaling techniques may also be introduced to support the concurrent reporting of HARQ feedback and channel information. Additionally, enhanced signaling techniques may be used to flexibly signal a configured mode of one or more modes for concurrently reporting HARQ feedback with channel information (which may be referred to as "bundled HARQ feedback/channel information") as well as one or more modes for reporting HARQ feedback without channel information (which may be referred to as "standalone HARQ feedback"). In some cases, modes for reporting HARQ feedback with or without channel information may be generally referred to as "reporting modes."

Figure 2:
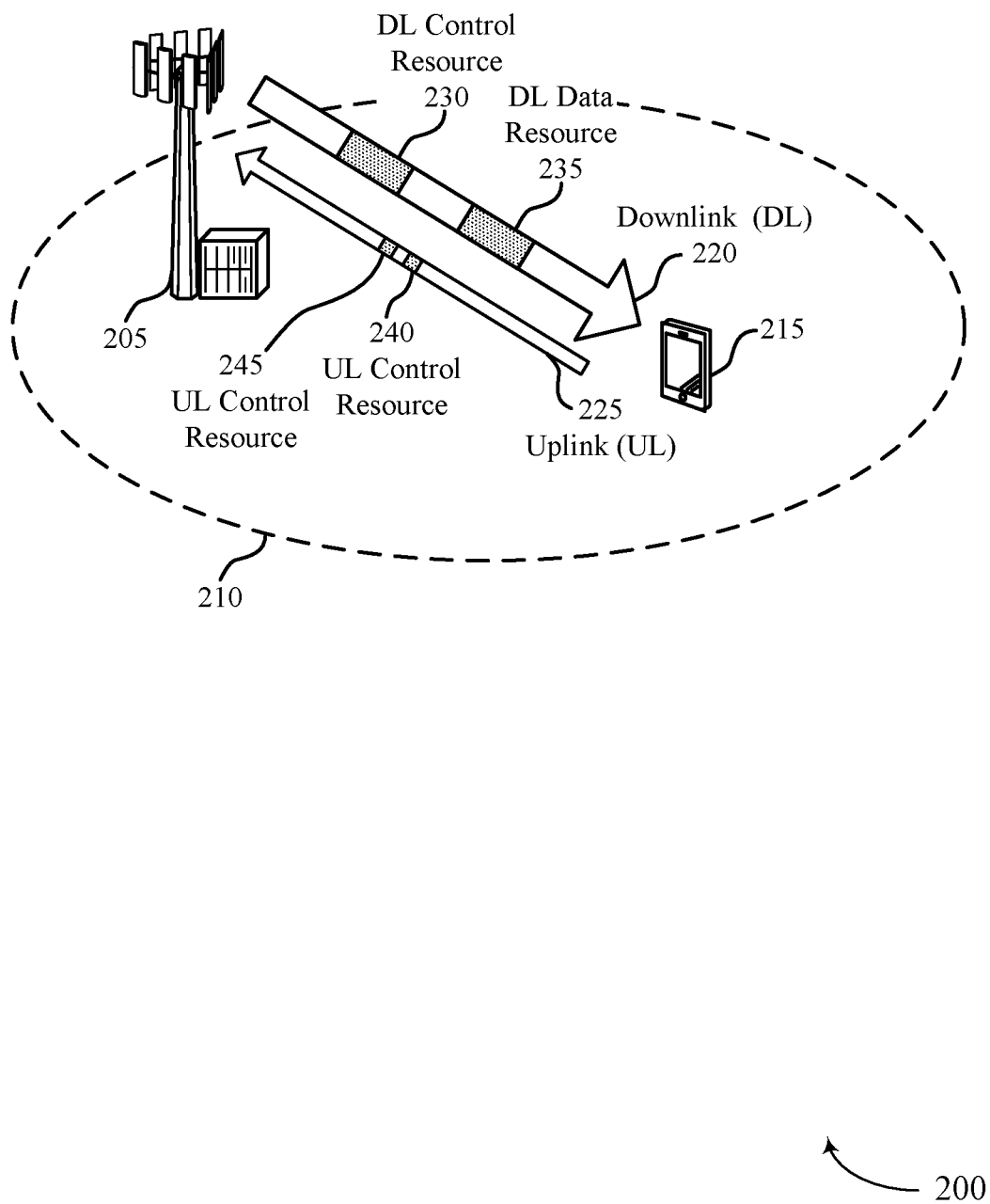
FIG. 2 illustrates aspects of a wireless communications subsystem that supports identifying a HARQ mode in accordance with various aspects of the present disclosure.

FIG. 2 illustrates aspects of a wireless communications subsystem that supports identifying a HARQ mode in accordance with various aspects of the present disclosure. Wireless communications subsystem 200 may include base station 205 and UE 215 which may be examples of a base station or UE described above with reference to FIG. 1. Base station 205 and UE 215 may communicate with one another within coverage area 210 using downlink 220 and uplink 225, using techniques described above with reference to FIG. 1.

As described above and herein, enhanced modes for reporting HARQ feedback with channel information may be employed. Also, enhanced signaling techniques may be used to support the enhanced reporting modes.

In some cases, UE 215 receives a control message (e.g., a DCI message) transmitted from base station 205 in downlink control resources (e.g., downlink control resource 230). The control message may indicate a location of (e.g., a set of time and frequency resources for) a transport block (or code block group) within downlink data resource 235. And UE 215 may decode the indicated transport block (or code block group) and may determine whether the transport block (or code block group) has been successfully decoded—e.g., based on a result of a cyclic redundancy check. UE 215 may then generate HARQ feedback based on a result of the decoding. For example, UE 215 may generate an ACK indicator if the transport block (or code block group) is successfully decoded or may generate a NACK indicator if the transport block (or code block group) is not successfully decoded.

In some examples, a HARQ/CSI mode may be configured for communications between base station 205 and UE 215, and UE 215 may be configured to transmit HARQ feedback and channel information over a same uplink control resource (e.g., first uplink control resource 240). In some cases, this mode may be referred to as Mode A. When Mode A is configured, the control message transmitted from base station 205 may also indicate a location of uplink control resources for UE 215. In some cases, the control message indicates a location of the uplink control resources relative to a downlink data resource.

While operating in Mode A, UE 215 may package (or bundle) the HARQ feedback generated for a transport block (or code block group) with a most recent channel information computed by UE 215. UE 215 may also determine that a single uplink control resource is configured for the transmission of the bundled HARQ feedback and channel information and may identify a location of the uplink control resource (e.g., first uplink control resource 240) relative to a downlink data resource (e.g., downlink data resource 235)—e.g., based on the control message. After bundling the HARQ feedback and channel information and identifying the uplink control resource, UE 215 may transmit the bundled HARQ feedback and channel information to base station 205 using resources allocated to UE 215 in the identified uplink control resources.

After receiving the bundled HARQ feedback and channel information over the same uplink control resource, base station 205 may adapt transmission parameters based on the indicated channel information. And base station 205 may perform subsequent transmissions (e.g., a transmission carrying new or redundant data) to UE 215 using the adapted transmission parameters. By adapting the transmission parameters, base station 205 may increase the likelihood of success for the subsequent transmission to UE 215, increasing a reliability of the wireless communications system. Adapting the transmission parameters may also decrease the amount of performed retransmissions that occur before UE 215 successfully receives downlink data, reducing latency for communications to UE 214 and/or increasing throughput for the wireless communication system.

In some examples, a HARQ/CSI mode may be configured for communications between base station 205 and UE 215, and UE 215 may be configured to transmit HARQ feedback and channel information over separate uplink control resources (e.g., first uplink control resource 240 and second uplink control resource 245). In some cases, this mode may be a variant of Mode A but may also be referred to as Mode A. When the variant of Mode A is configured and separate uplink control resources are used, the control message transmitted from base station 205 may also indicate a location of multiple uplink control resources for UE 215. In some cases, the control message indicates a location of the uplink control resources relative to a downlink data resource and/or relative to an uplink control resource dedicated to HARQ feedback.

While operating in the variant of Mode A, UE 215 may separately generate a HARQ feedback message and a channel information message in response to receiving a control message form base station 205. In some cases, UE 215 generates the channel information message based on receiving an indication in the control message that triggers UE 215 to report channel information.

UE 215 may also determine that the received control message has scheduled separate resources for transmitting HARQ feedback and channel information. UE 215 may then identify the separate resources based on information included in the control message. In some examples, the control message includes an indication of a slot for reporting the channel information message, an indication of uplink control resources for transmitting (e.g., second uplink control resource 245) the channel information message, power control information for transmitting the channel information, or any combination thereof. In some example, UE 215 may identify a first uplink control resource for transmitting the HARQ feedback (e.g., first uplink control resource 240) relative to a location of a downlink data resource (e.g., downlink data resource 235). And may identify a second uplink control resource for transmitting the channel information (e.g., second uplink control resource 245) based on a timing indicated in the control message. In some cases, the timing is associated with a duration for generating the channel information. In some cases, the second uplink control resource occurs after the first uplink control resource in time.

After identifying the separate uplink control resources, UE 215 may transmit HARQ feedback over the first uplink control resource and channel information over the second uplink control resource. After receiving the HARQ feedback and channel information, base station 205 may use the channel information to adapt transmission parameters for subsequent transmissions to UE 215.

In some examples, a HARQ/CSI mode may be configured for communications between base station 205 and UE 215, and UE 215 may be configured to transmit HARQ feedback and channel information over different uplink control resources based on whether a downlink communication is successfully received by UE 215. In some cases, this mode may be referred to as Mode A'. When Mode A' is configured, the control message transmitted from base station 205 may also indicate a location of multiple uplink control resources. In some cases, the control message indicates a location of the uplink control resources relative to a downlink data resource.

While operating in Mode A', if UE 215 fails to decode a transport block (or code block group), UE 215 may package (or bundle) the HARQ feedback generated for a transport block (or code block group) with a most recent channel information computed by UE 215. Otherwise, if UE 215 successfully decodes the transport block (or code block group), UE 215 may refrain from computing channel information and may solely generate HARQ feedback. In some cases, to support the transmission of bundled HARQ feedback in one uplink control resource and standalone HARQ feedback in another uplink control resource, the control message may include an indication of both uplink control resources. In some examples, the control message may indicate a location of both uplink control resources relative to a downlink data resource (e.g., downlink data resource 235). In some cases, the uplink control resources may be overlapping in time but non-overlapping in frequency.

In some examples, if UE 215 fails to decode a transport block (or code block group), UE 215 packages a NACK indicator with channel information and identifies the uplink control resource for transmitting the bundled HARQ feedback and channel information. UE 215 may then transmit the bundled HARQ feedback to base station 205 using the identified uplink control resource. Alternatively, if UE 215 successfully decodes a transport block (or code block group), UE 215 generates an ACK indicator and identifies the uplink control resource for transmitting the standalone HARQ feedback. UE 215 may then transmit the ACK indicator to base station 205 using the identified uplink control resource. By using separate uplink control resources for standalone HARQ feedback and bundled HARQ feedback transmissions, a wireless communications system may increase the number of UEs that can transmit on available uplink control resources. That is, even though bundled HARQ feedback may be larger than standalone HARQ feedback, if a rate of decoding failures is lower than a rate of decoding successes, a first uplink control resource for transmitting bundled HARQ feedback may support as many UEs as a second uplink control resource for transmitting standalone HARQ feedback. Using separate uplink control resources for standalone HARQ feedback and bundled feedback transmissions may also decrease power usage at a UE—e.g., because a UE may use less power when transmitting standalone HARQ feedback than when transmitting bundled HARQ feedback.

After receiving the standalone HARQ feedback, base station 205 may maintain transmission parameters for subsequent transmissions to UE 215. After receiving HARQ feedback bundled with channel information, base station 205 may adapt transmission parameters for subsequent transmissions to UE 215 based on the received channel information.

In some examples, a HARQ/CSI mode may be configured for communications between base station 205 and UE 215, and UE 215 may be configured to transmit joint HARQ feedback and channel information. In some cases, this mode may be referred to as Mode B. To support Mode B operation, HARQ feedback may use multi-bit indicators to indicate both HARQ feedback and channel information. For example, a first value (e.g., 00) may be used to indicate that a transport block (or code block group) was successfully received—that is, the first value may be equivalent to an ACK message. A second value (e.g., 01) may be used to indicate that a transport block (or code block group) was unsuccessfully received and that a log-likelihood ratio (LLR) (for example, an aggregated LLR score) has a first value. A third value (e.g., 10) may be used to indicate that a transport block (or code block group) was unsuccessfully received and that an LLR (for example, an aggregated LLR score) has a second value that is lower than the first LLR value. And a fourth value (e.g., 11) may be used to indicate that a transport block (or code block group) was unsuccessfully received and that an LLR (for example, an aggregated LLR score) has a third value that is lower than the first and second LLR values. An exemplary table representing the information indicated by the different values of the multi-bit indicator is provided by Table 1.

TABLE 1

| Multi-Bit Indicator | Information |
| --- | --- |
| 00 | ACK (Decode success for TB/CBG) |
| 01 | NACK (Decode fail; LLR is above a first threshold; Network can use same MCS for retransmission, which is likely to pass using LLR combining). *May also be selected for discontinuous transmission (DTX)* |
| 10 | NACK (Decode fail; LLR is below a first threshold and above a second threshold; Network adjusts MCS by first amount for retransmission (e.g., lower MCS by 2)) |

TABLE 1-continued

| Multi-Bit Indicator | Information |
| --- | --- |
| 11 | NACK (Decode fail; LLR is below the second threshold; Network adjusts MCS by second amount for retransmission (e.g., lower MCS by 5)) |

In some cases, by signaling the second value, UE 215 may request a first amount of resources to be used for the retransmission of downlink data. By signaling the third value, UE 215 may request a second amount of resources to be used for the retransmission of downlink data, where the second amount may be larger than the first amount. And by signaling the fourth value, UE 215 may request a third amount of resources to be used for the retransmission of downlink data, where the third amount may be larger than the second amount.

Additionally, or alternatively, the multi-bit indicator may be used to indicate a CQI value. In some examples, a second value (e.g., 01) may be used to indicate that a transport block (or code block group) was unsuccessfully received and that a previously reported CQI value used to perform an initial transmission remains valid—e.g., to indicate that base station 205 should use a same MCS for a retransmission. A third value (e.g., 10) may be used to indicate that a transport block (or code block group) was unsuccessfully received and that a previously reported CQI value used to perform an initial transmission is no longer valid—e.g., to indicate that base station 205 should use a different MCS for a retransmission. In some cases, the third value may indicate a first adjustment (for which a value may be represented by the variable X) to the previously reported CQI value. And a fourth value (e.g., 11) may be used to indicate that a transport block (or code block group) was unsuccessfully received and that a previously reported CQI value used to perform an initial transmission is no longer valid—e.g., to indicate that base station 205 should use a different MCS for a retransmission. In some cases, the fourth value may indicate a second adjustment (for which a value may be represented by the variable Y) to the previously reported CQI value. The second adjustment may be larger than the first adjustment. An exemplary table representing the information indicated by the different values of the multi-bit indicator is provided by Table 2.

TABLE 2

| Multi-Bit Indicator | Information |
| --- | --- |
| 00 | ACK (Decode success for TB/CBG) |
| 01 | NACK + same CQI value (Decode fail; CQI value has not decreased relative to previous CQI measurement; Network uses same MCS for retransmission) *May also be selected for DTX* |
| 10 | NACK + adjusted CQI value by X (Decode fail; CQI value has decreased relative to previous CQI measurement by X (e.g., 1); Network adjusts MCS by first amount for retransmission (e.g., decrease MCS by 1)) |
| 11 | NACK + adjusted CQI value by Y (Decode fail; CQI value has decreased relative to previous CQI measurement by Y (e.g., 2); |

TABLE 2-continued

| Multi-Bit Indicator | Information |
| --- | --- |
| | Network adjusts MCS by first amount for retransmission (e.g., decrease MCS by 2)) |

In some examples, a value for X and a value for Y may be selected by the network (e.g., preconfigured). In some examples, UE 215 selects a value for the multi-bit indicator based on calculating a difference between a CQI value reported before an initial transmission is performed and a CQI value calculated after the initial transmission is performed. For example, if UE 215 calculates a change in a CQI value that is greater than X and less than Y, UE 215 may select a value of "10" for the multi-bit indicator. In some cases, UE 215 may determine a change in CQI value after the initial transmission is performed based on calculating a signal-to-noise ratio (SNR) for a PDSCH used to convey the initial transmission. In some cases, UE 215 may determine a change in CQI value after the initial transmission is performed based on measuring CSI-RSs scheduled by a control message.

In some examples, a value used for a multi-bit indicator may serve a dual-purpose and be reused to indicate that a DCI message used for scheduling PDSCH resources was missed. An indication of a failure to receive a transport block (rather than a failure to decode a transport block) may be referred to as a DTX indicator. In some cases, UE 215 may select a particular value for the multi-bit indicator if either (1) there is a decoding failure or (2) UE 215 fails to receive the transport block. In some examples, UE 215 may select a value of "01" for the multi-bit indicator based on either (1) failing to decode a transport block and determining that the initial transmission parameters remain valid or (2) failing to receive the transport block. By reusing a value, all of the scenarios related to processing a transport block (e.g., ACK, NACK, DTX) may be mapped to the available values.

Another exemplary table representing the information indicated by the different values of the multi-bit indicator is provided by Table 3.

TABLE 3

| Multi-Bit Indicator | Information |
| --- | --- |
| 00 | ACK + adjusted CQI value by T (Decode success for TB/CBG; CQI value has improved relative to previous CQI measurement by T (e.g., 1); Network adjusts MCS by first amount (e.g., increase MCS by 1)) |
| 01 | NACK + adjusted CQI value by X (Decode fail; CQI value has decreased relative to previous CQI measurement by X (e.g., 1); Network adjusts MCS by first amount for retransmission (e.g., decrease MCS by 1) |
| 10 | NACK + adjusted CQI value by Y (Decode fail; CQI value has decreased relative to previous CQI measurement by Y (e.g., 2); Network adjusts MCS by first amount for retransmission (e.g., decrease MCS by 2) |
| 11 | NACK + adjusted CQI value by Z (Decode fail; CQI value has decreased relative to previous CQI measurement by Z (e.g., 3); |

TABLE 3-continued

| Multi-Bit Indicator | Information |
| --- | --- |
| | Network adjusts MCS by first amount for retransmission (e.g., decrease MCS by 3). |

In some examples, a value for T, a value for X, a value for Y, and a value for Z may be selected by the network (e.g., preconfigured). In some cases, T, X, Y, and Z are set to zero.

Another exemplary table representing the information indicated by the different values of the multi-bit indicator is provided by Table 4.

TABLE 4

| Multi-Bit Indicator | Information |
| --- | --- |
| 00 | ACK + adjusted CQI value by T (Decode success for TB/CBG; CQI value has improved relative to previous CQI measurement by T (e.g., 1); Network adjusts MCS by first amount for subsequent transmission (e.g., increase MCS by 1)) |
| 01 | DTX (CQI update is not provided) |
| 10 | NACK + adjusted CQI value by X (Decode fail; CQI value has decreased relative to previous CQI measurement by X (e.g., 1); Network adjusts MCS by first amount for retransmission (e.g., decrease MCS by 1) |
| 11 | NACK + adjusted CQI value by Y (Decode fail; CQI value has decreased relative to previous CQI measurement by Y (e.g., 2); Network adjusts MCS by first amount for retransmission (e.g., decrease MCS by 2) |

In some examples, a value for T, a value for X, and a value for Y, and a value for Z may be selected by the network (e.g., preconfigured). In some cases, T, X, and Y are set to zero.

When Mode B is configured, the control message transmitted from base station 205 may also indicate a location of an uplink control resources for transmitting the joint HARQ feedback and channel information. In some cases, the control message indicates a location of the uplink control resource relative to a downlink data resource.

While operating in Mode B and after attempting to decode a transport block (or code block group), UE 215 may select one of the above values based on a result of the decoding and/or calculated channel information. For example, if UE 215 successfully decodes the transport block (or code block group), UE 215 may select the first value to include in the HARQ feedback. Alternatively, if UE 215 fails to decode the transport block (or code block group), UE 215 may select one of the other three values based on channel information calculated at the UE. For example, if UE 215 determines that LLR for decoding the first transport block (or code block group) exceed the first LLR value, UE 215 may select the first value for including in the HARQ feedback. After selecting one of the values to include in the joint HARQ/channel information feedback, UE 215 may transmit the joint HARQ/channel information feedback to base station 205.

Base station 205 may receive the joint HARQ/channel information feedback from UE 215 and may determine whether to adapt subsequent transmission to UE 215 based on the received joint HARQ/channel information feedback.

In some examples, base station 205 may use unadjusted transmission parameters for subsequent transmissions to UE 215 if the first value (e.g., "00") is received. In some examples, base station 205 may use unadjusted transmission parameters for subsequent transmissions to UE 215 if the second value (e.g., "01") is received—e.g., because the LLR measured by UE 215 exceeds a threshold value and with LLR combining the retransmission is likely to be successfully decoded without modified transmission parameters). In some examples, base station 205 may use adjusted transmission parameters for subsequent transmissions to UE 215 if the third value (e.g., "10") is received—e.g., base station 205 may adjust an MCS by 2 levels. And in some examples, base station 205 may use adjusted transmission parameters for subsequent transmissions to UE 215 if the fourth value (e.g., "11") is received—e.g., base station 205 may adjust an MCS by 5 levels.

In some examples, Mode B may be modified so that none of the values correspond to an explicit ACK indicator. This modified mode may be referred to as Mode B'. To support Mode B' operation, a first value (e.g., "00") may be used to indicate that a transport block (or code block group) was unsuccessfully received and that a log-likelihood ratio (LLR) has a first value. A second value (e.g., "01") may be used to indicate that a transport block (or code block group) was unsuccessfully received and that an LLR has a second value that is lower than the first LLR value. A third value (e.g., "10") may be used to indicate that a transport block (or code block group) was unsuccessfully received and that an LLR has a third value that is lower than the first and second LLR values. And a fourth value (e.g., "11") may be used to indicate that a transport block (or code block group) was unsuccessfully received and that an LLR has a fourth value that is lower than the first, second, and third LLR values. In some cases, by signaling the first value, UE 215 may request a first amount of resources to be used for the retransmission of downlink data. By signaling the second value, UE 215 may request a second amount of resources to be used for the retransmission of downlink data, where the second amount may be larger than the first amount. By signaling the third value, UE 215 may request a third amount of resources to be used for the retransmission of downlink data, where the third amount may be larger than the second amount. And by signaling the fourth value, UE 215 may request a fourth amount of resources to be used for the retransmission of downlink data, where the fourth amount may be larger than the third amount. An exemplary table representing the information indicated by the different values of the multi-bit indicator is provided by Table 5.

TABLE 5

| Multi-Bit Indicator | Information |
| --- | --- |
| 00 | NACK (Decode fail; LLR is above a first threshold; Network can use same MCS for retransmission, which is likely to pass using LLR combining) *May also be selected for DTX* |
| 01 | NACK (Decode fail; LLR is below a first threshold and above a second threshold; Network adjusts MCS by first amount for retransmission (e.g., lower MCS by 2)) |
| 10 | NACK (Decode fail; LLR is below the second threshold and above a third threshold; Network adjusts |

TABLE 5-continued

| Multi-Bit Indicator | Information |
| --- | --- |
| | MCS by second amount for retransmission (e.g., lower MCS by 5)) |
| 11 | NACK (Decode fail; LLR is below the third threshold; Network adjusts MCS by second amount for retransmission (e.g., lower MCS by 7)) |

Additionally, or alternatively, the multi-bit indicator may be used to indicate a CQI value. In some examples, a first value (e.g., 00) may be used to indicate that a transport block (or code block group) was unsuccessfully received and that a previously reported CQI value used to perform an initial transmission remains valid—e.g., to indicate that base station 205 should use a same MCS for a retransmission. A second value (e.g., 01) may be used to indicate that a transport block (or code block group) was unsuccessfully received and that a previously reported CQI value used to perform an initial transmission is no longer valid—e.g., to indicate that base station 205 should use a different MCS for a retransmission. In some cases, the second value may indicate a first adjustment (for which a value may be represented by the variable X) to the previously reported CQI value. And a third value (e.g., 10) may be used to indicate that a transport block (or code block group) was unsuccessfully received and that a previously reported CQI value used to perform an initial transmission is no longer valid—e.g., to indicate that base station 205 should use a different MCS for a retransmission. In some cases, the third value may indicate a second adjustment (for which a value may be represented by the variable Y) to the previously reported CQI value. The second adjustment may be larger than the first adjustment. And a fourth value (e.g., 11) may be used to indicate that a transport block (or code block group) was unsuccessfully received and that a previously reported CQI value used to perform an initial transmission is no longer valid—e.g., to indicate that base station 205 should use a different MCS for a retransmission. In some cases, the fourth value may indicate a third adjustment (for which a value may be represented by the variable Z) to the previously reported CQI value. The third adjustment may be larger than the second adjustment. An exemplary table representing the information indicated by the different values of the multi-bit indicator is provided by Table 6.

TABLE 6

| Multi-Bit Indicator | Information |
| --- | --- |
| 00 | NACK + same CQI value (Decode fail; CQI value has not decreased relative to previous CQI measurement; Network uses same MCS for retransmission) *May also be selected for DTX* |
| 01 | NACK + adjusted CQI value by X (Decode fail; CQI value has decreased relative to previous CQI measurement by X (e.g., 1); Network adjusts MCS by first amount for retransmission (e.g., decrease MCS by 1)) |
| 10 | NACK + adjusted CQI value by Y (Decode fail; CQI value has decreased relative to previous CQI measurement by Y (e.g., 2); Network adjusts MCS by first amount for retransmission (e.g., |

TABLE 6-continued

| Multi-Bit Indicator | Information |
| --- | --- |
| | decrease MCS by 2)) |
| 11 | NACK + adjusted CQI value by Z (Decode fail; CQI value has decreased relative to previous CQI measurement by Z (e.g., 3); Network adjusts MCS by first amount for retransmission (e.g., decrease MCS by 3). |

In some examples, a value for X, a value for Y, and a value for Z may be selected by the network (e.g., preconfigured). In some examples, UE 215 selects a value for the multi-bit indicator based on calculating a difference between a CQI value reported before an initial transmission is performed and a CQI value calculated after the initial transmission is performed. For example, if UE 215 calculates a change in a CQI value that is greater than X and less than Y, UE 215 may select a value of "01" for the multi-bit indicator. In some cases, UE 215 may determine a change in CQI value after the initial transmission is performed based on calculating an SNR for a PDSCH used to convey the initial transmission. In some cases, UE 215 may determine a change in CQI value after the initial transmission is performed based on measuring CSI-RSs scheduled by a control message.

In some examples, a value used for a multi-bit indicator may serve a dual-purpose and be reused to indicate that a DCI message used for scheduling PDSCH resources was missed. In some cases, UE 215 may select a particular value for the multi-bit indicator if either (1) there is a decoding failure or (2) UE 215 fails to receive the transport block. In some examples, UE 215 may select a value of "00" for the multi-bit indicator based on either (1) failing to decode a transport block and determining that the initial transmission parameters remain valid or (2) failing to receive the transport block. By reusing a value, all of the scenarios related to processing a transport block (e.g., ACK, NACK, DTX) may be mapped to the available values.

In some examples, Mode B may be modified to support indicating a failure to receive a transport block (e.g., a DTX indicator). This modified mode may be referred to as Mode B'. To support Mode B' operation, a first value (e.g., "00") may be used to indicate that a transport block (or code block group) was successfully received—e.g., to signal an ACK indicator. A second value (e.g., "01") may be used to indicate that a transport block (or code block group) was unsuccessfully decoded—e.g., to signal a NACK indicator. A third value (e.g., "10") may be used to indicate that a transport block (or code block group) was unsuccessfully received (or missed). In some cases, the fourth value (e.g., "11") may be left unused. Accordingly, the multi-bit indicator may be used to indicate the different reception-based scenarios associated with processing a transport block. An exemplary table representing the information indicated by the different values of the multi-bit indicator is provided by Table 7.

TABLE 7

| Multi-Bit Indicator | Information |
| --- | --- |
| 00 | ACK (Decode success for TB/CBG) |
| 01 | NACK (Decode fail) |
| 10 | DTX (DCI message missed) |
| 11 | Unused/Reserved |

In other cases, the fourth value may be used to indicate that a transport block (or code block group) was unsuccessfully decoded along with channel information. For example, the fourth value may request that a lower rank or a different transmission beam be used when performing a retransmission. Accordingly, the multi-bit indicator may be more fully utilized. An exemplary table representing the information indicated by the different values of the multi-bit indicator is provided by Table 8.

TABLE 8

| Multi-Bit Indicator | Information |
| --- | --- |
| 00 | ACK (Decode success for TB/CBG) |
| 01 | NACK (Decode fail) |
| 10 | DTX (DCI message missed) |
| 11 | NACK + channel information (Decode fail; Request network fall back to rank 1 or for network to use different transmission beam) |

In some examples, Mode B may be modified so that one of the values correspond to an explicit NACK indicator, while the other values correspond to multi-level ACK indicator. This modified mode may be referred to as Mode B". To support Mode B" operation, a first value (e.g., "00") may be used to indicate that a transport block (or code block group) was unsuccessfully received. A second value (e.g., "01") may be used to indicate that a transport block (or code block group) was successfully received and that an LLR has a first value, as well as a first LLR value. A third value (e.g., "10") may be used to indicate that a transport block (or code block group) was successfully received and that an LLR has a second value that is lower than the first LLR value, as well as a second LLR value. And a fourth value (e.g., "11") may be used to indicate that a transport block (or code block group) was successfully received and that an LLR has a third value that is lower than the first and second LLR values, as well as a third LLR value.

TABLE 9

| Multi-Bit Indicator | Information |
| --- | --- |
| 00 | NACK (Decode fail) |
| 01 | ACK (Decode success; LLR is above a first threshold; Network leaves MCS unchanged for subsequent transmissions) |
| 10 | ACK (Decode success; LLR is below the first threshold and above a second threshold; Network adjusts MCS by second amount for subsequent transmissions (e.g., lower MCS by 2)) |
| 11 | ACK (Decode success; LLR is below the second threshold; Network adjusts MCS by second amount for retransmission (e.g., lower MCS by 4)) |

Additional modifications of Mode B may also be used that relate to using the multi-bit indicators to indicate different combinations of acknowledgment information, LLR information, and DTX information—by combining aspects of Tables 1 through 9. For example, a first multi-bit indicator value may be used to indicate a NACK and a first LLR value, a second multi-bit indicator value may be used to indicate a NACK and a second LLR value, a third multi-bit indicator value may be used to indicate an ACK and a third LLR value, and a fourth multi-bit indicator value maybe used to indicate an ACK and a fourth LLR value.

In some cases, a standalone HARQ mode may be configured for communications between base station 205 and UE 215, and UE 215 may be configured to transmit HARQ feedback without channel information over an uplink control resource (e.g., first uplink control resource 240) that is indicated by a control message. In some cases, this mode may be referred to as Mode 0.

As described above and herein, enhanced signaling may be used to support the concurrent use of multiple of the above modes for reporting HARQ feedback and channel information. That is, to support the flexible scheduling of a mode for transmitting standalone HARQ feedback as well as the above modes for transmitting bundled HARQ feedback and channel information, enhanced signaling may be used to signal a currently configured mode.

In some examples, base station 205 configures a particular mode for reporting standalone HARQ feedback or bundled HARQ feedback and channel information—e.g., base station 205 may configure Mode B. In some cases, to explicitly indicate the configured mode to UE 215, base station 205 may set an indicator in a field of a DCI message that is configured to indicate any one of the above modes—e.g., a value of "000" may indicate Mode 0, a value of "001" may indicate Mode A, a value of "010" may indicate Mode A', a value of "011" may indicate Mode B, and a value of "100" may indicate Mode B'. Base station 205 may then transmit a DCI message with the indicator to UE 215, and UE 215 may decode the DCI message and obtain a value of the indicator. Based on the value of the indicator, UE 215 may determine what reporting mode is configured and may identify uplink control resources and generate HARQ feedback with, or without, channel information accordingly.

In some cases, to indicate the configured mode to UE 215, base station 205 may select a DCI format that is unique to a reporting mode. For example, after selecting a first reporting mode, base station 205 may select a first DCI format having a first structure—e.g., the first structure including a first set of fields that have a first set of lengths. And after selecting a second reporting mode, base station 205 may select a second DCI format having a second structure—e.g., the second structure having a second set of fields that have a second set of lengths. In some cases, the second set of fields includes additional fields relative to the first set of fields. In some cases, a field common to the first set of fields and the second set of fields has different lengths for the different DCI formats. Base station 205 may then transmit a DCI message with the indicator to UE 215, and UE 215 may decode the DCI message according to one of the DCI formats. In some cases, UE 215 tries to decode the DCI message according to each of the available DCI formats until the DCI message is successfully decoded. Based on the DCI format used to successfully decode the DCI message, UE 215 may determine what reporting mode is configured and may identify uplink control resources and generate HARQ feedback with, or without, channel information accordingly. For example, UE 215 may attempt to decode a DCI message according to a DCI format that is used by base station 205 when Mode B is configured. And UE 215 may determine that Mode B is configured if the decoding is successful.

In some cases, to indicate the configured mode to UE 215, base station 205 may both select DCI formats that are unique to a reporting mode and include an indication of a reporting mode in one or more of the DCI formats. For example, base station 205 may select a first DCI format when a standalone HARQ feedback reporting mode (e.g., Mode 0) is configured and may select a second DCI format when any of multiple bundled HARQ feedback reporting modes (e.g., Modes A/A'B/B'/B") are configured. In some cases, base station 205 may select first DCI format as a fallback format for communicating with UEs—e.g., to indicate scheduled resources for UEs that have not indicated a capability for reporting bundled HARQ feedback. When one of the bundled HARQ feedback reporting modes is configured, base station 205 may select the second DCI format and set an indicator in a reporting mode indication field to indicate which of the bundled HARQ feedback reporting modes is configured. Base station 205 may then transmit a DCI message according to a selected DCI format and/or including an explicit reporting mode indication (e.g., if a bundled HARQ feedback reporting mode is configured) to UE 215. And UE 215 may identify a configured reporting mode and may identify uplink control resources and generate HARQ feedback with, or without, channel information accordingly.

In some cases, to indicate the configured mode to UE 215, base station 205 may transmit RRC signaling that explicitly indicates one of the HARQ feedback reporting modes. In some cases, UE 215 may use the HARQ feedback reporting mode until an RRC reconfiguration signal is received. In other cases, the HARQ feedback reporting mode may be overridden by physical layer control signaling—e.g., by an indication in a DCI message.

Figure 3A:
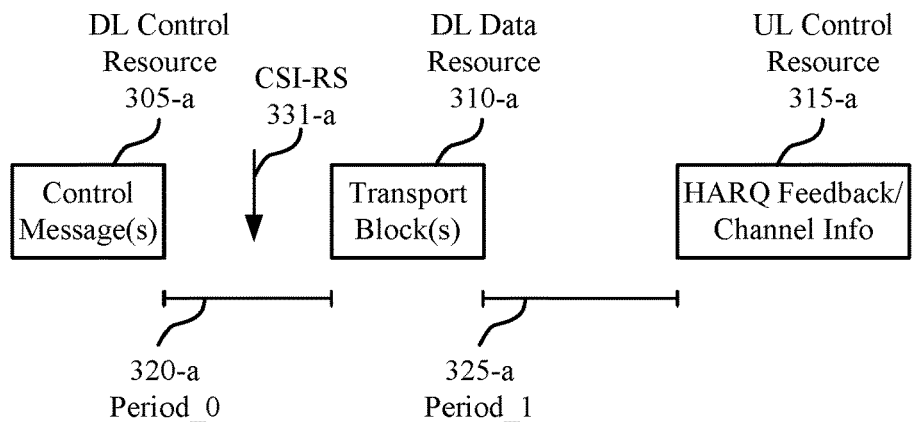
FIGS. 3A through 3C illustrate aspects of resource maps that support identifying a HARQ mode in accordance with various aspects of the present disclosure.

FIG. 3A illustrates aspects of a resource map that supports identifying a HARQ mode in accordance with various aspects of the present disclosure. Resource map 300-a may illustrate a configuration of communication resources that are allocated to a communications channel. Resource map 300-a may depict communication resources including downlink control resource 305-a, downlink data resource 310-a, uplink control resource 315-a, and CSI-RS Resource 331-a. Resource map 300-a may also depict a timing between communication resources including first period 320-a and second period 325-a.

Downlink control resource 305-a may include communication resources that are used by a control channel and may also be referred to as a physical downlink control channel (PDCCH) resource. Control information, which may include downlink grants, uplink grants, etc., for one or more UEs may be transmitted using communication resources included in downlink control resource 305-a. In some cases, control information is included in a DCI message.

CSI-RS Resource 331-a may include communications resources that are used to transmit CSI-RS. In some cases, CSI-RS may be used to determine information about a channel. In some examples, the CSI-RS may be scheduled by control information included in the downlink control resource 305-a.

Downlink data resource 310-a may include communication resources that are used by a data channel and may also be referred to as a PDSCH resource. Data information, which may include user data, application data, etc., for one or more UEs may be transmitted using communication resources included in downlink data resource 310-a. In some cases, data information for a UE is conveyed in a transport block or a code block group. In some cases, a location of communication resources carrying a data message for a UE may be indicated in a DCI message received by the UE in downlink control resource 305-a. In some cases, first period 320-a may depict a timing between the transmission of a control message and a data message from a base station. In some cases, a length of first period 320-a is implicitly indicated by a time domain resource allocation (TDRA) table included in the DCI message. In some cases, first period 320-a may be referred to as K0.

Uplink control resource 315-*a* may include communication resources that are used by an uplink control channel and may also be referred to as a PUCCH resource. Uplink control information, such as HARQ feedback, CSI reports, SR, and the like, may be transmitted using uplink control resources. In some cases, the communication resources in uplink control resource 315-*a* may be configured to convey HARQ feedback and channel information. In some cases, second period 325-*a* may depict a timing between the transmission of a data message from a base station and an occurrence of uplink resources that are scheduled for a UE by the base station. In some cases, a length of second period 325-*a* is explicitly indicated by an indicator in the DCI message. In some cases, second period 325-*a* may be referred to as K1. In some cases, the channel information reported using uplink control resource 315-*a* may be calculated using signals that occur after downlink control resource 305-*a* (e.g., using CSI-RSs received in CSI-RS resource 331-*a*).

In some examples, resource map 300-*a* depicts an exemplary set of resources that is used by a UE and base station to support the reporting of HARQ feedback that is bundled with channel information. As depicted in FIG. 3A, a UE may receive a DCI message over downlink control resource 305-*a* that indicates a configured reporting mode. In some cases, the configured reporting mode may be implicitly indicated by a format used for the DCI message, as described herein and in FIG. 2. In some cases, the configured reporting mode may be explicitly indicated by an indicator included in the DCI message, as described herein and in FIG. 2. In some cases, the configured reporting mode may be both implicitly and explicitly indicated, as described herein and in FIG. 2. The DCI message may also indicate a location of a transport block (or code block group) carrying data for a UE and may indicate a location of an uplink control resource that is scheduled for the UE to transmit HARQ feedback and channel information. After receiving the DCI message, the UE may decode an indicated transport block (or code block group) in downlink data resource 310-*a* and may generate HARQ feedback based on a success of the decoding. The UE may also generate channel information based on receiving the DCI message. The UE may then bundle the HARQ feedback and channel information and transmit the bundled information over the indicated uplink control resource 315-*a*. In some cases, resource map 300-*a* depicts a configuration of resources that occurs when a first reporting mode (e.g., any of Modes A/B/B'/B" described in FIG. 2) is configured.

Figure 3B:
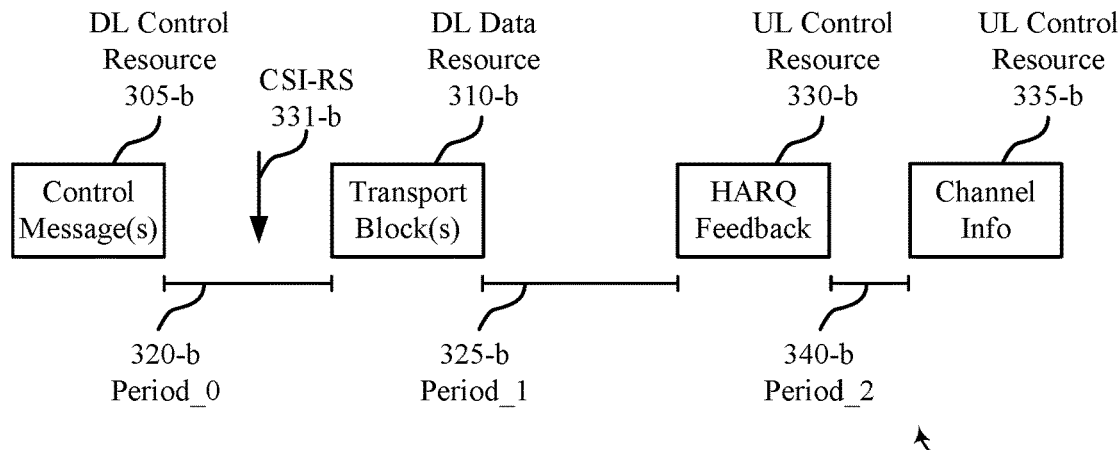

FIG. 3B illustrates aspects of a resource map that supports identifying a HARQ mode in accordance with various aspects of the present disclosure. Resource map 300-*b* may illustrate a configuration of communication resources that are allocated to a communications channel. Resource map 300-*b* may depict communication resources including downlink control resource 305-*b*, downlink data resource 310-*b*, and CSI-RS Resource 331-*b*, which may be examples of downlink control resource 305-*a*, downlink data resource 310-*a*, and CSI-RS Resource 331-*a*, as described in FIG. 3A. Resource map 300-*b* may also depict a timing between communication resources including first period 320-*b* and second period 325-*b*, which may be examples of first period 320-*a* and second period 325-*a*, as described in FIG. 3A. Resource map 300-*b* may also include first uplink control resource 330-*b*, second uplink control resource 335-*b*, and third period 340-*b*.

First uplink control resource 330-*b* may include communication resources that are used by an uplink control channel and may also be referred to as a PUCCH resource. In some cases, the communication resources in first uplink control resource 330-*b* may be configured to convey HARQ feedback. In some cases, second period 325-*b* may depict a timing between the transmission of a data message from a base station and an occurrence of uplink resources that are scheduled for a UE by the base station.

Second uplink control resource 335-*b* may also include communication resource that are used by the uplink control channel. In some cases, the communication resources in second uplink control resource 335-*b* may be configured to convey channel information. In some cases, third period 340-*b* may depict a timing between the transmission of HARQ feedback and an occurrence of uplink resources that are scheduled for a UE by the base station to transmit channel information. In some cases, a length of third period 340-*b* is implicitly indicated in the DCI message—e.g., the length of 340-*b* may be determined based on a timing of a slot indicated for second uplink control resource 335-*b* relative to a timing of first uplink control resource 330-*b*.

In some examples, resource map 300-*b* depicts an exemplary set of resources that is used by a UE and base station to support the reporting of HARQ feedback along with channel information. As depicted in FIG. 3B, a UE may receive a DCI message over downlink control resource 305-*b* that indicates a configured reporting mode, as described herein. The DCI message may also indicate a location of a transport block (or code block group) carrying data for a UE and may indicate a location of multiple uplink control resources that are scheduled for the UE to transmit HARQ feedback and channel information. To indicate the location of second uplink control resource 335-*b*, the DCI message may include a bit that triggers the channel information reporting, an indication of a slot for transmitting the channel information, an indication of frequency resources within the slot that are allocated to the UE, an indication of power control for transmitting the channel information, or any combination thereof.

After receiving the DCI message, the UE may decode an indicated transport block (or code block group) in downlink data resource 310-*b* and may generate HARQ feedback based on a success of the decoding. The UE may also generate channel information based on receiving the DCI message. The UE may then transmit the HARQ feedback over the indicated first uplink control resource 330-*b* and may transmit the channel information over the indicated second uplink control resource 335-*b*. In some cases, resource map 300-*b* depicts a configuration of resources that occurs when a first reporting mode (e.g., any of Modes A/B/B'/B" described in FIG. 2) is configured.

Figure 3C:
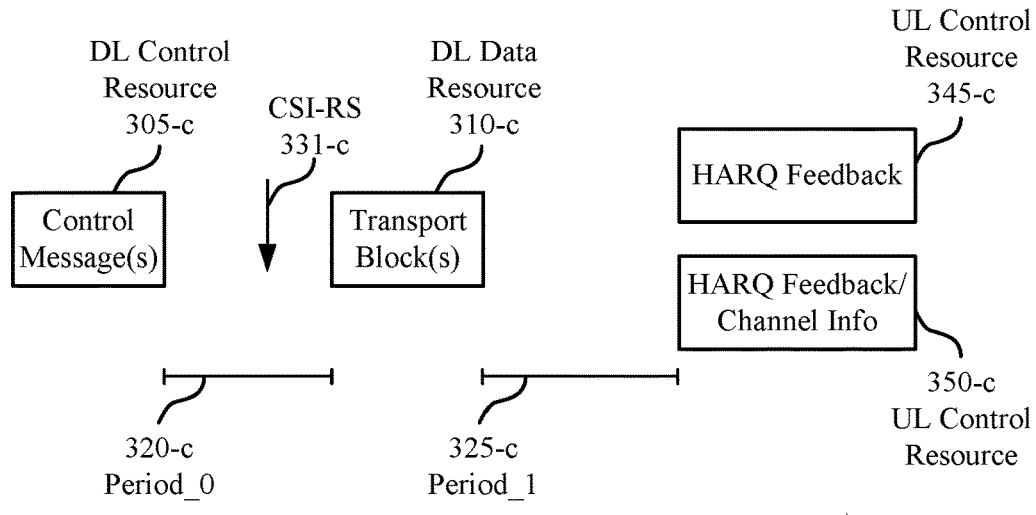

FIG. 3C illustrates aspects of a resource map that supports identifying a HARQ mode in accordance with various aspects of the present disclosure. Resource map 300-*c* may illustrate a configuration of communication resources that are allocated to a communications channel. Resource map 300-*c* may depict communication resources including downlink control resource 305-*c*, downlink data resource 310-*c*, and CSI-RS Resource 331-*c*, which may be examples of downlink control resource 305-*a*, downlink control resource 305-*b*, downlink data resource 310-*a*, downlink data resource 310-*b*, CSI-RS Resource 331-*a*, and CSI-RS Resource 331-*b*, as described in FIGS. 3A and 3B. Resource map 300-*c* may also depict a timing between communication resources including first period 320-*c* and second period 325-*c*, which may be examples of first period 320-*a*, first period 320-*b*, second period 325-*a*, and second period 325-*b*, as described in FIGS. 3A and 3B. Resource map 300-c may also include first uplink control resource 345-c and second uplink control resource 350-c.

First uplink control resource 345-c may include communication resources that are used by an uplink control channel and may also be referred to as a PUCCH resource. In some cases, the communication resources in first uplink control resource 345-c may be configured to convey HARQ feedback on its own when data transmitted in downlink data resource 310-c is successfully decoded by a UE. In some cases, second period 325-c may depict a timing between the transmission of a data message from a base station and an occurrence of uplink resources that are scheduled for a UE by the base station.

Second uplink control resource 350-c may include communication resources that are used by an uplink control channel and may also be referred to as a PUCCH resource. In some cases, the communication resources in second uplink control resource 350-c may be configured to convey bundled HARQ and channel information feedback when data transmitted in downlink data resource 310-c is not successfully decoded by a UE. In some cases, second period 325-c may depict a timing between the transmission of a data message from a base station and an occurrence of uplink resources that are scheduled for a UE by the base station.

In some examples, resource map 300-c depicts an exemplary set of resources that is used by a UE and base station to support the reporting of HARQ feedback along with channel information. As depicted in FIG. 3C, a UE may receive a DCI message over downlink control resource 305-c that indicates a configured reporting mode, as described herein. The DCI message may also indicate a location of a transport block (or code block group) carrying data for a UE and may indicate a location of multiple uplink control resources that are scheduled for the UE to transmit HARQ feedback and channel information. In some cases, to indicate the location of the multiple uplink control resources, the DCI message may include an indication of frequency resources allocated to first uplink control resource 345-c and an indication of different frequency resources allocated to second uplink control resource 350-c. In some cases, the different frequency resources may be non-overlapping. In some examples, the DCI message may further indicate that first uplink control resource 345-c is to be used for transmissions of only HARQ feedback when a UE successfully decodes a corresponding transport block (or code block group) and that second uplink control resource 350-c is to be used for transmission of bundled HARQ feedback and channel info when a UE fails to decode the corresponding transport block (or code block group).

After receiving the DCI message, the UE may decode an indicated transport block (or code block group) in downlink data resource 310-c and may generate HARQ feedback based on a success of the decoding. The UE may also generate channel information based on receiving the DCI message and a success of the decoding. For example, if the decoding is successful, the UE may generate an ACK indication and may refrain from generating channel information, and the UE may transmit the ACK indication over first uplink control resource 345-c. Alternatively, if the decoding is unsuccessful, the UE may generate a NACK indication and channel information, and may transmit the bundled information over second uplink control resource 350-c. In some cases, resource map 300-c depicts a configuration of resources that occurs when a first reporting mode (e.g., Modes A' described in FIG. 2) is configured.

Figure 4:
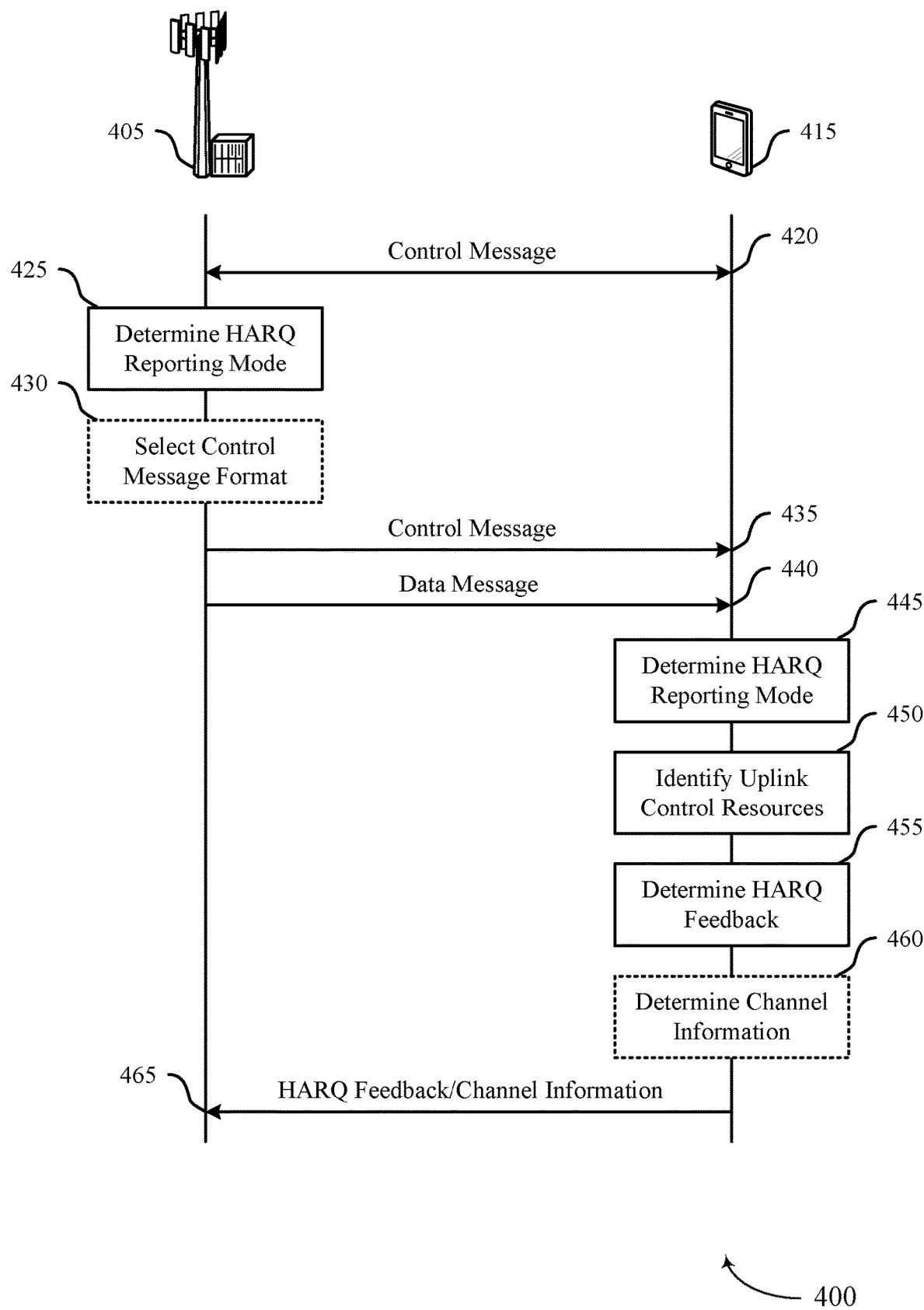
FIG. 4 illustrates aspects of a process for identifying a HARQ mode in accordance with various aspects of the present disclosure.

FIG. 4 illustrates aspects of a process for identifying a HARQ mode in accordance with various aspects of the present disclosure. Process flow 400 may be performed by base station 405 and UE 415, which may be examples of a base station or UE described above with reference to FIGS. 1 and 2.

In some examples, process flow 400 illustrates operations that are performed by a base station (e.g., base station 405) and a UE (e.g., UE 415) to communicate data between the base station and the UE and to report uplink information (e.g., HARQ feedback, channel information, etc.) that improves subsequent communications between the base station and UE.

At arrow 420, base station 405 and UE 415 may exchange control signaling (e.g., RRC control signaling, MAC control signaling, or PDCCH control signaling). In some cases, UE 415 may signal a capability message that indicates UE 415 is capable of reporting HARQ feedback with, or without, channel information. In some cases, base station 405 may signal a configuration message to UE 415 that causes UE 415 to configure a HARQ feedback reporting mode (e.g., any one of Modes 0/A/A'/B/B'/B").

At block 425, base station 405 may determine a mode for reporting HARQ feedback. In some cases, base station 405 determines to use a mode for reporting standalone HARQ feedback (e.g., Mode 0). In some cases, base station 405 determines to use a mode that supports reporting HARQ feedback that is bundled with channel information (e.g., Modes A/A'/B/B'/B"). In some examples, base station 405 determines to use a mode that supports reporting HARQ feedback with channel information based on an error rate for communications between base station 405 and UE 415 exceeding a threshold error rate.

At block 430, base station 405 may select a format for a control message based on the determined HARQ reporting mode. The control message may be used to indicate resources used for a downlink transmission to UE 415 and/or to indicate a location of uplink control resources for transmitting standalone HARQ feedback and/or bundled HARQ feedback. In some cases, base station 405 may select a first format for a control message if a standalone HARQ feedback reporting mode is selected and may select a second format for a control message if a bundled HARQ feedback reporting mode is selected. In some examples, the second format for the control message may include a field for indicating which of multiple bundles HARQ feedback reporting modes is configured at base station 405. In some cases, base station 405 may select a first format for a control message if a standalone HARQ feedback reporting mode is selected, a second format for a control message if a first bundled HARQ feedback reporting mode is selected, a third format for a control message if a first bundled HARQ feedback reporting mode is selected, and so on. In some cases, base station 405 may select a single format for a control message regardless of whether a standalone HARQ feedback reporting mode or a bundled HARQ feedback reporting mode is selected. The single format for the control message may include a field for indication which HARQ feedback reporting mode is configured at base station 405 (e.g., any of Modes 0/A/A'/B/B'/B").

At arrow 435, base station 405 may transmit a control message to UE 415 based on the selected control message format. In some cases, base station 405 transmits the control message in downlink control resources (e.g., PDCCH resource). In some cases, the control message is transmitted according to a format used to indicate that a bundled HARQ feedback reporting mode is activated. In some cases, the control message includes an indication that a bundled HARQ feedback reporting mode is activated. In some examples, the control message also includes an indication of downlink data resources and uplink control resources for UE 415.

At arrow 440, base station 405 may transmit a data message to UE 415. In some cases, the data message is transmitted over downlink data resources that are identified by information included in the transmitted control message. After receiving the control and data messages, UE 415 may identify the downlink data resources and attempt to decode the data message.

At block 445, UE 415 may determine a mode for reporting HARQ feedback. In some cases, UE 415 determines the mode for reporting HARQ feedback based on the received control message—e.g., based on a format of the control message or an indicator in the control message. In some cases, UE 415 determines the mode for reporting HARQ feedback based on an initial configuration message received by UE 415 that configures a particular HARQ feedback reporting mode for UE 415.

At block 450, UE 415 may identify uplink control resources based on the determined mode for reporting HARQ feedback. In some cases, UE 415 may identify a single uplink control resource for reporting standalone HARQ feedback (e.g., if Mode 0 is configured). In some cases, UE 415 may identify a single uplink control resource for reporting HARQ feedback bundled with channel information—e.g., if Mode A/B/B'/B" is configured and the control message indicates a single uplink control resource—and as described in FIG. 3A. In some cases, UE 415 may identify separate uplink control resources for reporting HARQ feedback and channel information—e.g., if Mode A is configured and the control message indicates multiple uplink control resource—and as described in FIG. 3B. In some cases, UE 415 may identify separate uplink control resources for reporting ACK feedback and for reporting NACK feedback bundled with channel information—e.g., if Mode A' is configured—and as described in FIG. 3C.

At block 455, UE 415 may determine HARQ feedback for reporting to base station 405. In some cases, UE 415 may generate an ACK indicator based on successfully decoding the data message. In other cases, UE may generate a NACK indicator based on failing to decode the data message.

At block 460, UE 415 may determine channel information for reporting to base station 405. In some cases, UE 415 may refrain from determining channel information—e.g., if Mode 0 is configured or if an ACK indicator is generated and Mode A' is configured. In some cases, UE 415 may determine the channel information based on reference signals (e.g., CSI-RS) that occur before or during the transmission of the data message. In some cases, UE 415 may determine a quality of a channel between base station 405 and UE 415. In some cases, UE 415 may use a result of an LLR operation to determine a quality of the channel. In some cases, UE 415 may determine a preferred set of antenna resources, a preferred precoding matrix, and/or a preferred transmission beam based on measurements of the channel.

At arrow 465, UE 415 may transmit standalone HARQ feedback or HARQ feedback that is bundled with channel information. In some cases, UE 415 transmits standalone HARQ feedback to base station 405. For example, UE 415 may transmit standalone HARQ feedback if Mode 0 is configured at UE 415. In another example, UE 415 may transmit standalone HARQ feedback if Mode A' is configured at UE 415 and UE successfully decodes the data message—e.g., UE 415 may transmit an ACK indicator over an uplink control resource that is configured for the transmission of only ACK indicators.

In some cases, UE 415 transmits HARQ feedback that is bundled with channel information. For example, UE 415 may transmit bundled HARQ feedback/channel information if Mode A is configured. In some examples, UE 415 may transmit bundled HARQ feedback/channel information if Mode A' is configured and U 415 fails to decode the data message—e.g., UE 415 may transmit a NACK indicator over an uplink control resource that is configured for the transmission of NACK indicators bundled with channel information. In some examples, UE 415 may transmit bundled HARQ feedback/channel information if Mode B/B'/B" is configured.

After receiving the HARQ feedback from UE 415, base station 405 may adapt transmission parameters for subsequent transmissions—e.g., if a NACK indicator and/or channel information is received from UE 415.

Figure 5:
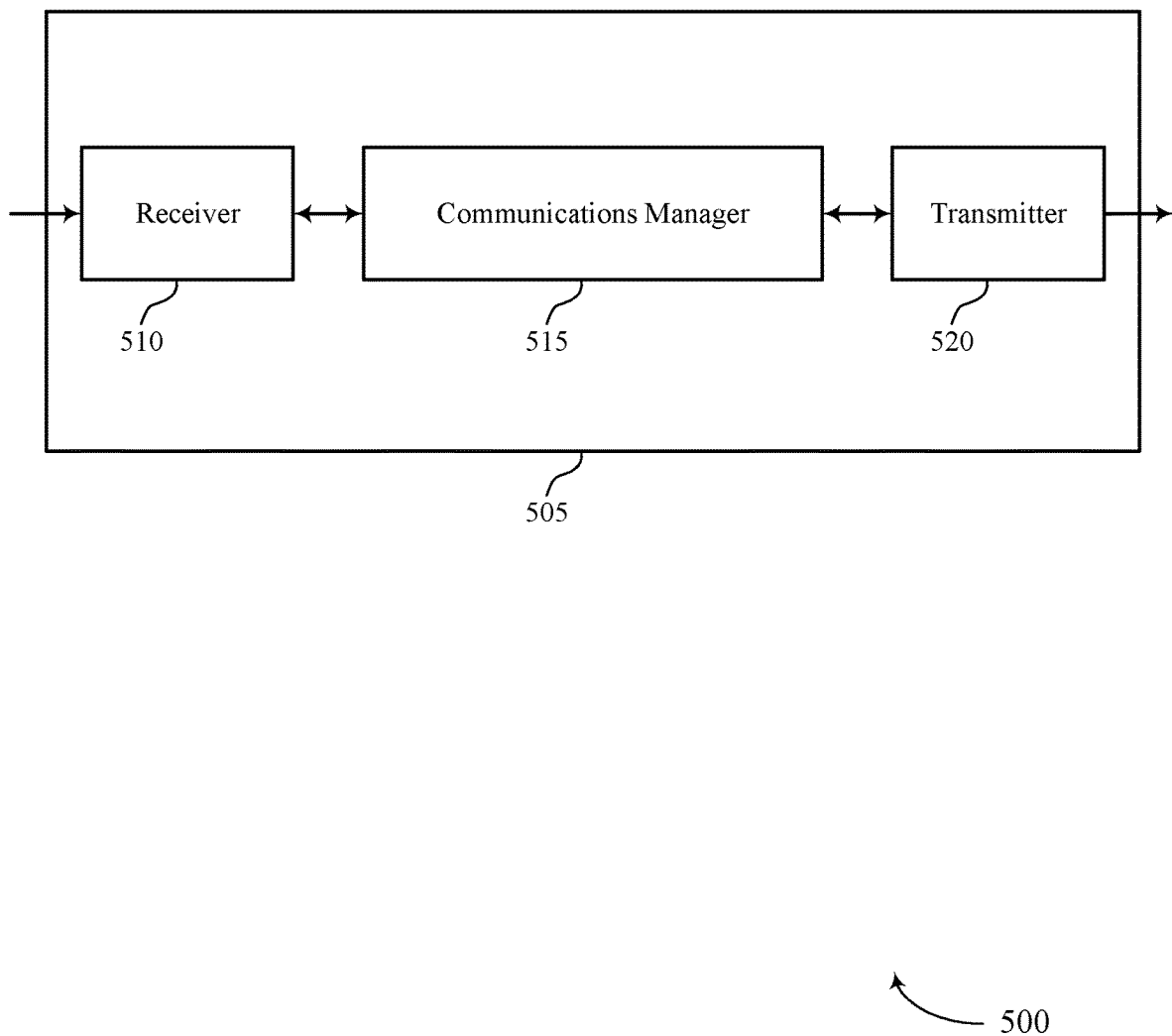
FIGS. 5 and 6 show block diagrams of devices that support identifying a HARQ mode in accordance with aspects of the present disclosure.

FIG. 5 shows a block diagram 500 of a device 505 that supports identifying a HARQ mode in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to identifying a HARQ mode, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determine to use the first mode for transmitting the HARQ feedback and the channel information based on the downlink control message, and transmit the HARQ feedback and the channel information according to the first mode. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital system processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
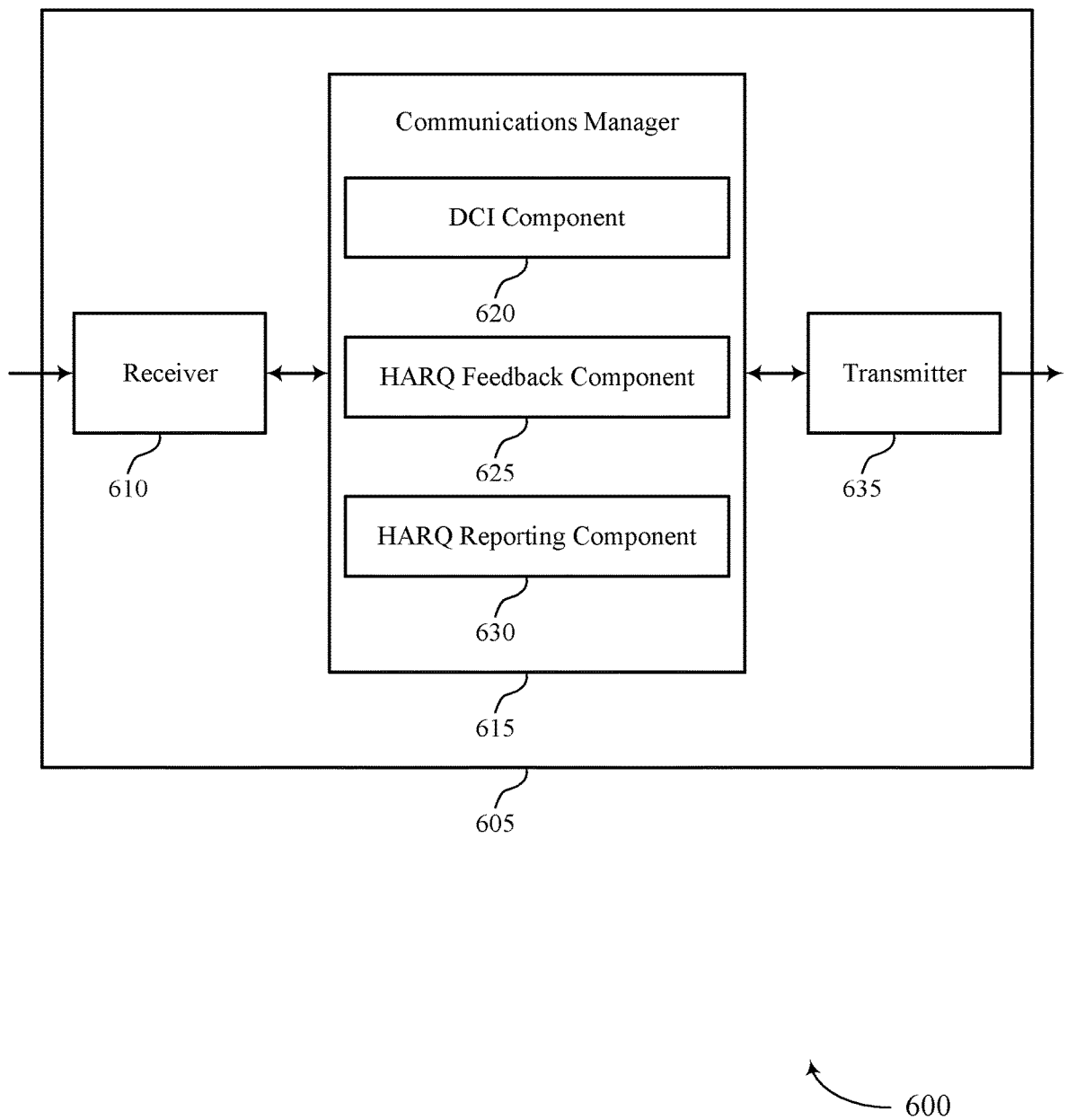

FIG. 6 shows a block diagram 600 of a device 605 that supports identifying a HARQ mode in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to identifying a HARQ mode, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a DCI component 620, a HARQ feedback component 625, and a HARQ reporting component 630. The communications manager 615 may be an example of aspects of the communications manager 810 described herein.

The DCI component 620 may receive a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration.

The HARQ feedback component 625 may determine to use the first mode for transmitting the HARQ feedback and the channel information based on the downlink control message.

The HARQ reporting component 630 may transmit the HARQ feedback and the channel information according to the first mode.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
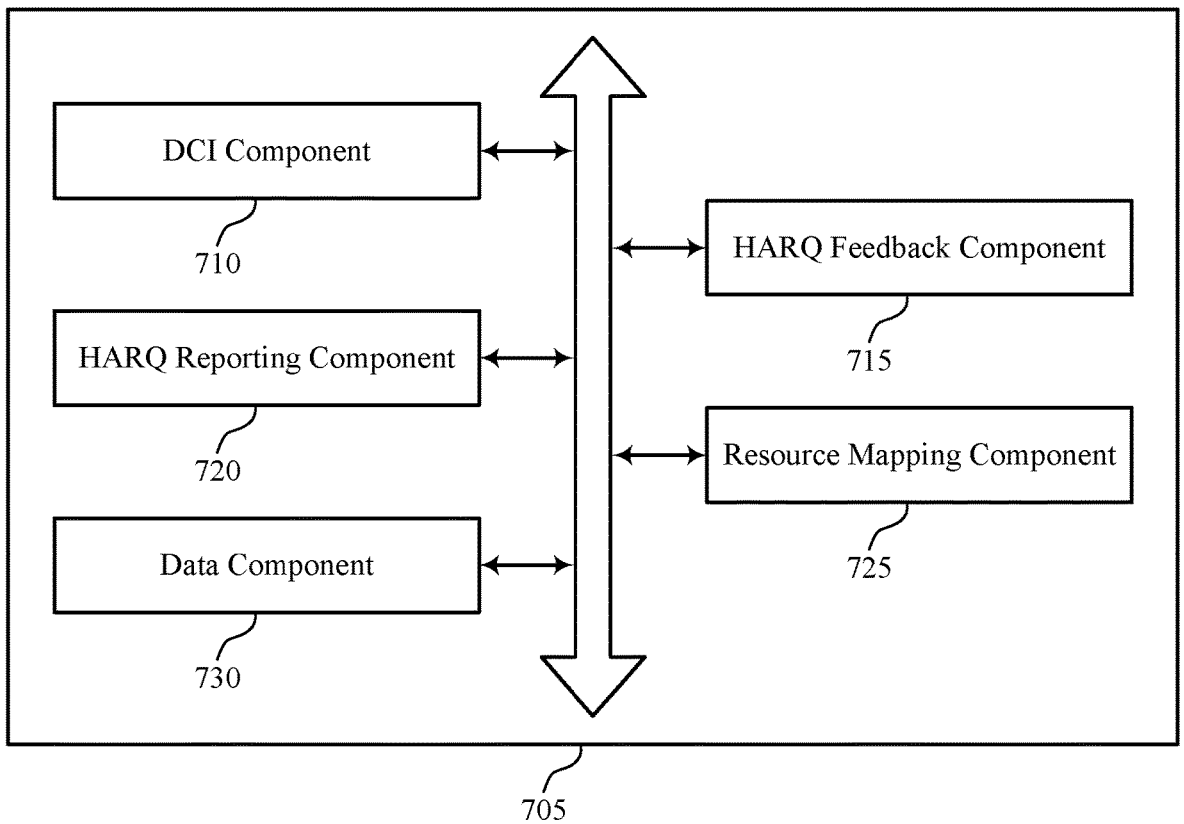
FIG. 7 shows a block diagram of a communications manager that supports identifying a HARQ mode in accordance with aspects of the present disclosure.

FIG. 7 shows a block diagram 700 of a communications manager 705 that supports identifying a HARQ mode in accordance with aspects of the present disclosure. The communications manager 705 may be an example of aspects of a communications manager 515, a communications manager 615, or a communications manager 810 described herein. The communications manager 705 may include a DCI component 710, a HARQ feedback component 715, a HARQ reporting component 720, a resource mapping component 725, and a data component 730. Each of these modules may communicate, directly or indirectly, with one another (e.g., via one or more buses).

The DCI component 710 may receive a downlink control message that supports indicating one of a plurality of modes for reporting HARQ feedback, wherein a first mode of the plurality of modes supports reporting HARQ feedback and channel information according to a bundling configuration, and a second mode of the plurality of modes supports reporting HARQ feedback according to a standalone configuration. In some cases, the downlink control message includes an indicator that triggers the UE to report the channel information, an indication of a timing for transmitting the channel information, an indication of an uplink control resource for transmitting the channel information, an indication of a power for transmitting the channel information, or any combination thereof. In some cases, the DCI component 710 may identify a channel state information reference signal resource based at least in part on an indication of the channel state information reference signal resource included in the downlink control message, wherein the channel information is determined based at least in part on the channel state information reference signal resource.

The HARQ feedback component 715 may determine to use the first mode for transmitting the HARQ feedback and the channel information based on the downlink control message. In some cases, the HARQ feedback component 715 may bundle the HARQ feedback with the channel information based on determining to use the first mode, wherein the HARQ feedback and the channel information may be transmitted after the bundling.

In some cases, multiple values may correspond to multiple combinations of HARQ feedback and channel information, and the HARQ feedback component 715 may select, based on determining to use the first mode, one of the plurality of values based on a decoding of a data transmission scheduled by the downlink control message and a measurement of a channel condition, wherein the transmitted HARQ feedback and the transmitted channel information includes the selected one of the plurality of values. In some cases, the HARQ feedback component 715 may determine a first value of a channel quality indicator, wherein the data transmission is based at least in part on the first value and determine a second value of the channel quality indicator after a failure by the data component 730 fails to decode the transmission, wherein the one of the plurality of values may be selected based at least in part on a difference between the first value and the second value. In some cases, the second value of the channel quality indicator is based at least in part on a signal strength for the data transmission.

In some cases, a first value of the plurality of values corresponds to a successful decoding of the data transmission; a second value of the plurality of values corresponds to an unsuccessful decoding of the data transmission and a first channel measurement; a third value of the plurality of values corresponds to the unsuccessful decoding of the data transmission and a second channel measurement; and a fourth value of the plurality of values corresponds to the unsuccessful decoding of the data transmission and a third channel measurement. In some cases, the second value corresponds to a missed downlink control message.

In some cases, a first value of the plurality of values corresponds to an unsuccessful decoding of the data transmission and a first channel measurement; a second value of the plurality of values corresponds to the unsuccessful decoding of the data transmission and a second channel measurement; a third value of the plurality of values corresponds to the unsuccessful decoding of the data transmission and a third channel measurement; and a fourth value of the plurality of values corresponds to the unsuccessful decoding of the data transmission and a fourth channel measurement. In some cases, the first value corresponds to a missed downlink control message.

In some cases, a first value of the plurality of values corresponds to a successful decoding of the data transmission; a second value of the plurality of values corresponds to an unsuccessful decoding of the data transmission; and a third value of the plurality of values corresponds to a missed downlink control message. In some cases, a fourth value of the plurality of values corresponds to the unsuccessful decoding of the data transmission and a first channel measurement.

The resource mapping component 725 may identify an uplink control resource based on determining to use the first mode, wherein the HARQ feedback and the channel information are transmitted in the uplink control resource. In some cases, the resource mapping component 725 may identify a plurality of uplink control resources based on determining to use the first mode, wherein the HARQ feedback is transmitted in a first uplink control resource of the plurality of uplink control resources and the channel information is transmitted in a second uplink control resource of the plurality of uplink control resources.

The data component 730 may receive a downlink data transmission based on the downlink control message. In some cases, the data component 730 may determine that a decoding of the downlink data transmission was successful. In some cases, the HARQ feedback component 715 may refrain from bundling the HARQ feedback with the channel information based on the decoding being successful, wherein transmitting the HARQ feedback and the channel information includes transmitting the HARQ feedback without the channel information. In some cases, the resource mapping component 725 may identify a plurality of uplink control resources based on determining to use the first mode, wherein a first uplink control resource of the plurality of uplink control resources is configured for transmissions of HARQ feedback and a second uplink control resource of the plurality of uplink control resources is configured for transmissions of bundled HARQ feedback and channel information.

In some cases, the data component 730 may determine that a decoding of the downlink data transmission was unsuccessful. In some cases, the HARQ feedback component 715 may bundle the HARQ feedback with the channel information based on the decoding being unsuccessful. In some cases, the resource mapping component 725 may identify a plurality of uplink control resources based on determining to use the first mode, wherein a first uplink control resource of the plurality of uplink control resources is configured for transmissions of HARQ feedback and a second uplink control resource of the plurality of uplink control resources is configured for transmissions of bundled HARQ feedback and channel information.

The HARQ reporting component 720 may transmit the HARQ feedback and the channel information according to the first mode. In some cases, the HARQ feedback and channel information is transmitted over the second uplink control resource based on the decoding being unsuccessful.

In some cases, the DCI component 710 may decode an indicator field in the downlink control message, the indicator field including an indication of the first mode, and the HARQ feedback component 715 may activate the first mode based on the indication. In some cases, the DCI component 710 may receive a second downlink control message that supports indicating one of the plurality of modes for reporting HARQ feedback. In some case, the DCI component 710 may decode the indicator field in the second downlink control message, the indicator field including a second indication of the second mode. In some cases, the HARQ feedback component 715 may activate the second mode based on the second indication. And in some cases, the HARQ reporting component 720 may transmit second HARQ feedback according to the second mode.

In some cases, the DCI component 710 may identify a format of the downlink control message, and the HARQ feedback component 715 may determine that the format of the downlink control message corresponds to the first mode and may activate the first mode based on the format of the downlink control message. In some cases, the DCI component 710 may receive a second downlink control message that supports indicating one of the plurality of modes for reporting HARQ feedback. In some cases, the HARQ feedback component 715 may determine that a second format of the second downlink control message corresponds to the second mode and may activate the second mode based on the format of the second downlink control message. And in some cases, the HARQ reporting component 720 may transmit second HARQ feedback according to the second mode.

In some cases, the DCI component 710 may receive a radio resource control message; decode an indicator field in the radio resource control message, the indicator field comprising an indication of the first mode; and the HARQ feedback component 715 activate the first mode based at least in part on the indication.

Figure 8:
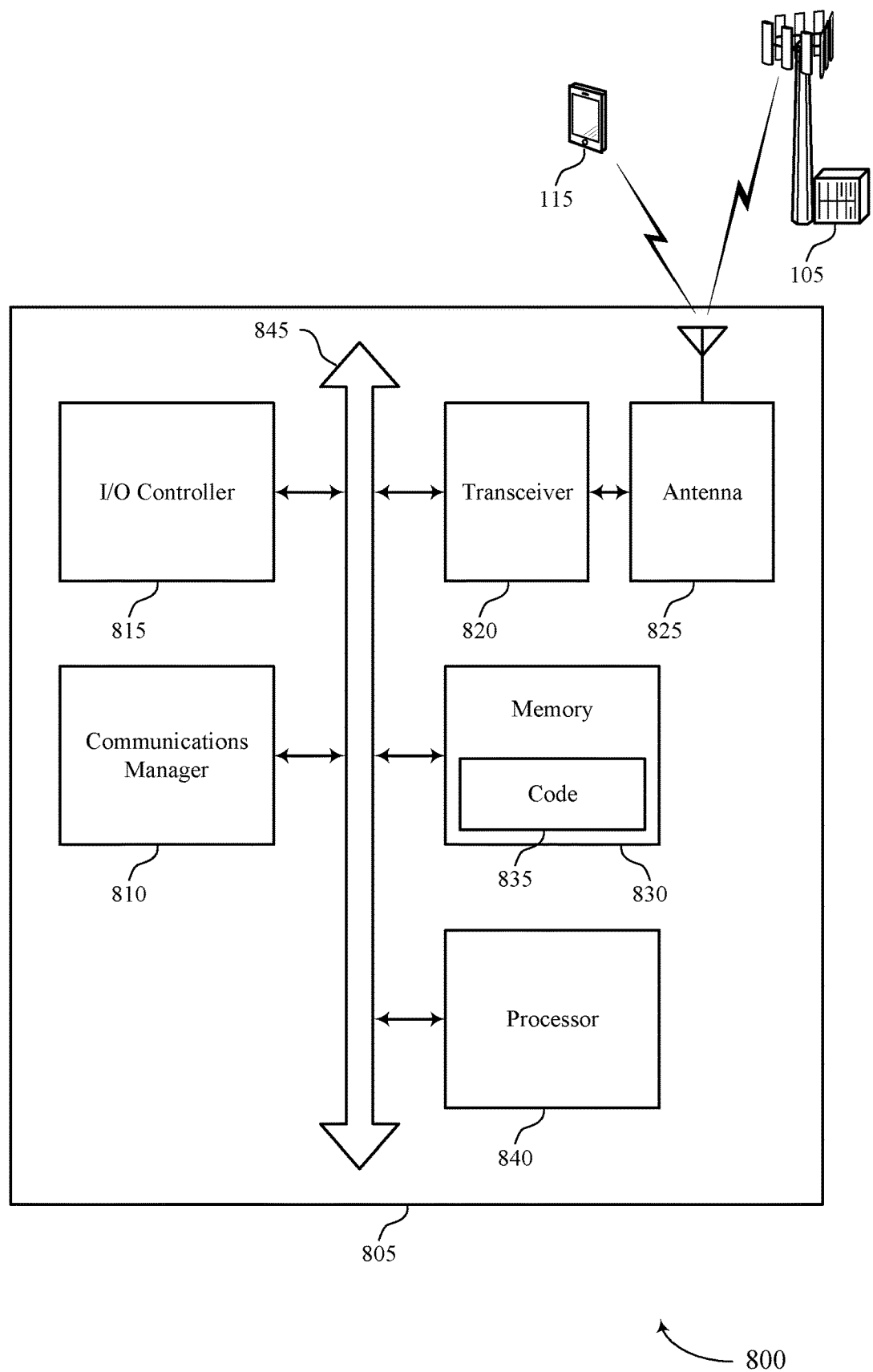
FIG. 8 shows a diagram of a system including a device that supports identifying a HARQ mode in accordance with aspects of the present disclosure.

FIG. 8 shows a diagram of a system 800 including a device 805 that supports identifying a HARQ mode in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determine to use the first mode for transmitting the HARQ feedback and the channel information based on the downlink control message, and transmit the HARQ feedback and the channel information according to the first mode.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting identifying a HARQ mode).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
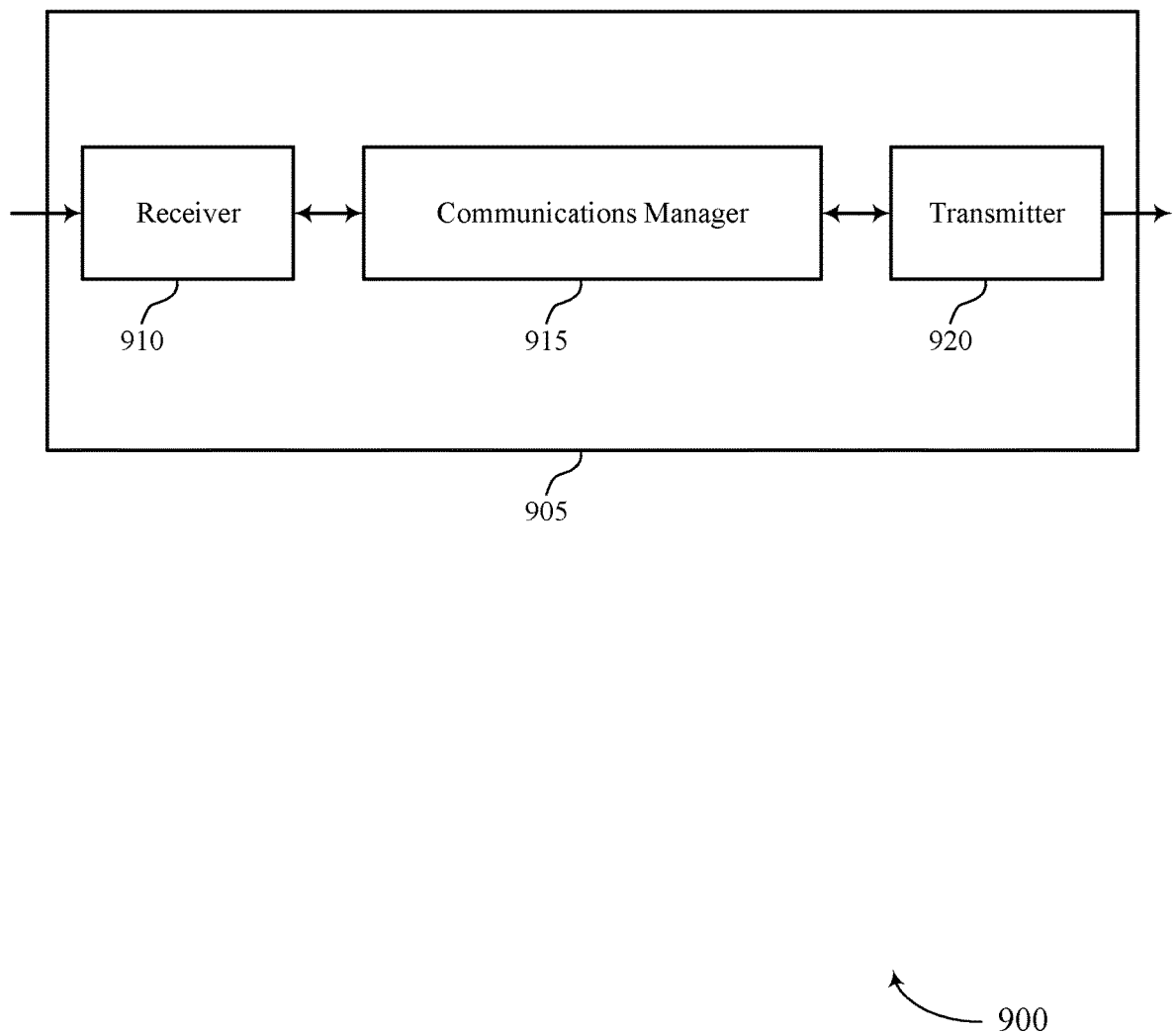
FIGS. 9 and 10 show block diagrams of devices that support identifying a HARQ mode in accordance with aspects of the present disclosure.

FIG. 9 shows a block diagram 900 of a device 905 that supports identifying a HARQ mode in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to identifying a HARQ mode, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determine to use the first mode for receiving the HARQ feedback and the channel information based on the downlink control message, and receive the HARQ feedback and the channel information according to the first mode. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
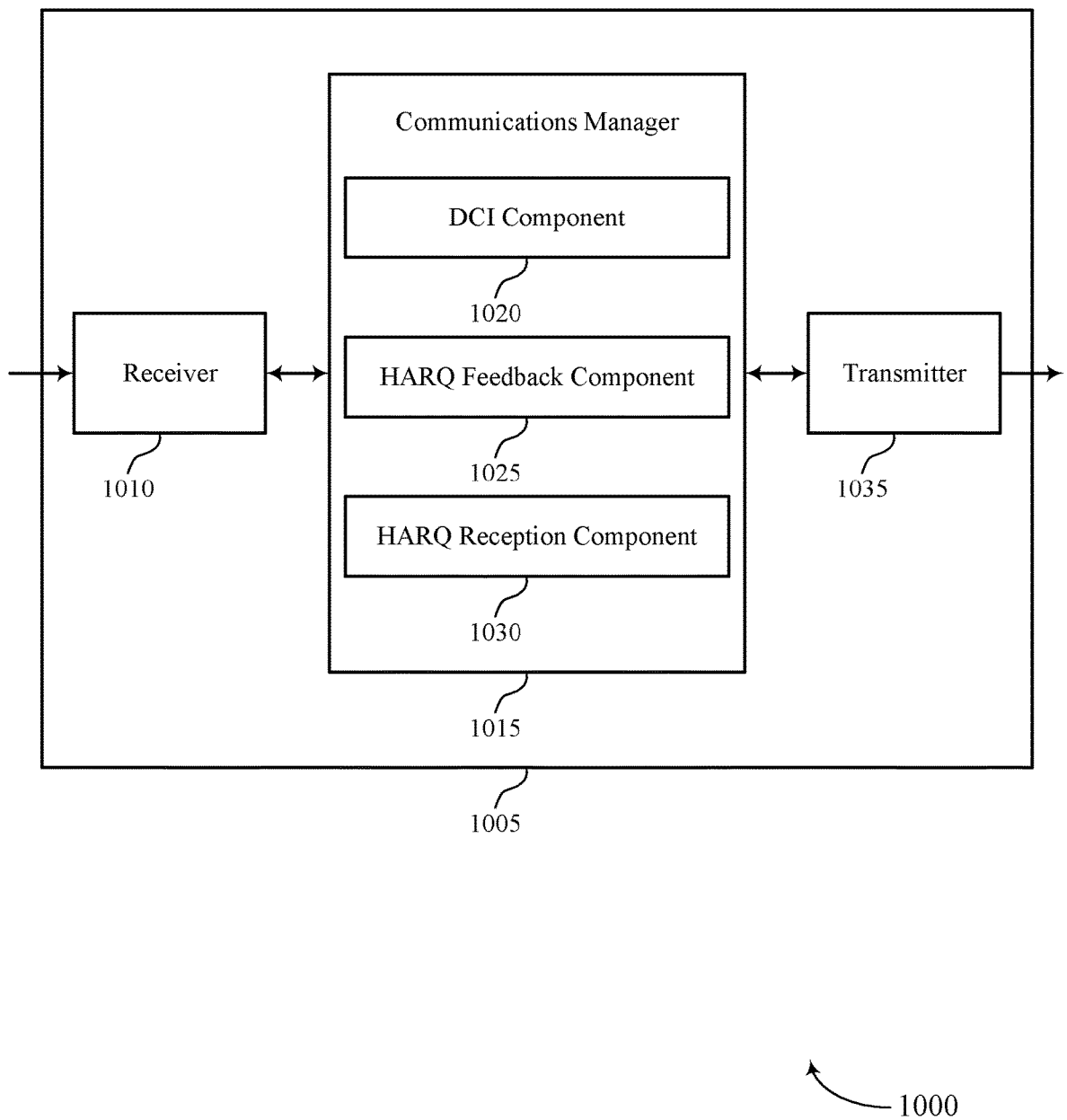

FIG. 10 shows a block diagram 1000 of a device 1005 that supports identifying a HARQ mode in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to identifying a HARQ mode, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a DCI component 1020, a HARQ feedback component 1025, and a HARQ reception component 1030. The communications manager 1015 may be an example of aspects of the communications manager 1210 described herein.

The DCI component 1020 may transmit a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration.

The HARQ feedback component 1025 may determine to use the first mode for receiving the HARQ feedback and the channel information based on the downlink control message.

The HARQ reception component 1030 may receive the HARQ feedback and the channel information according to the first mode.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
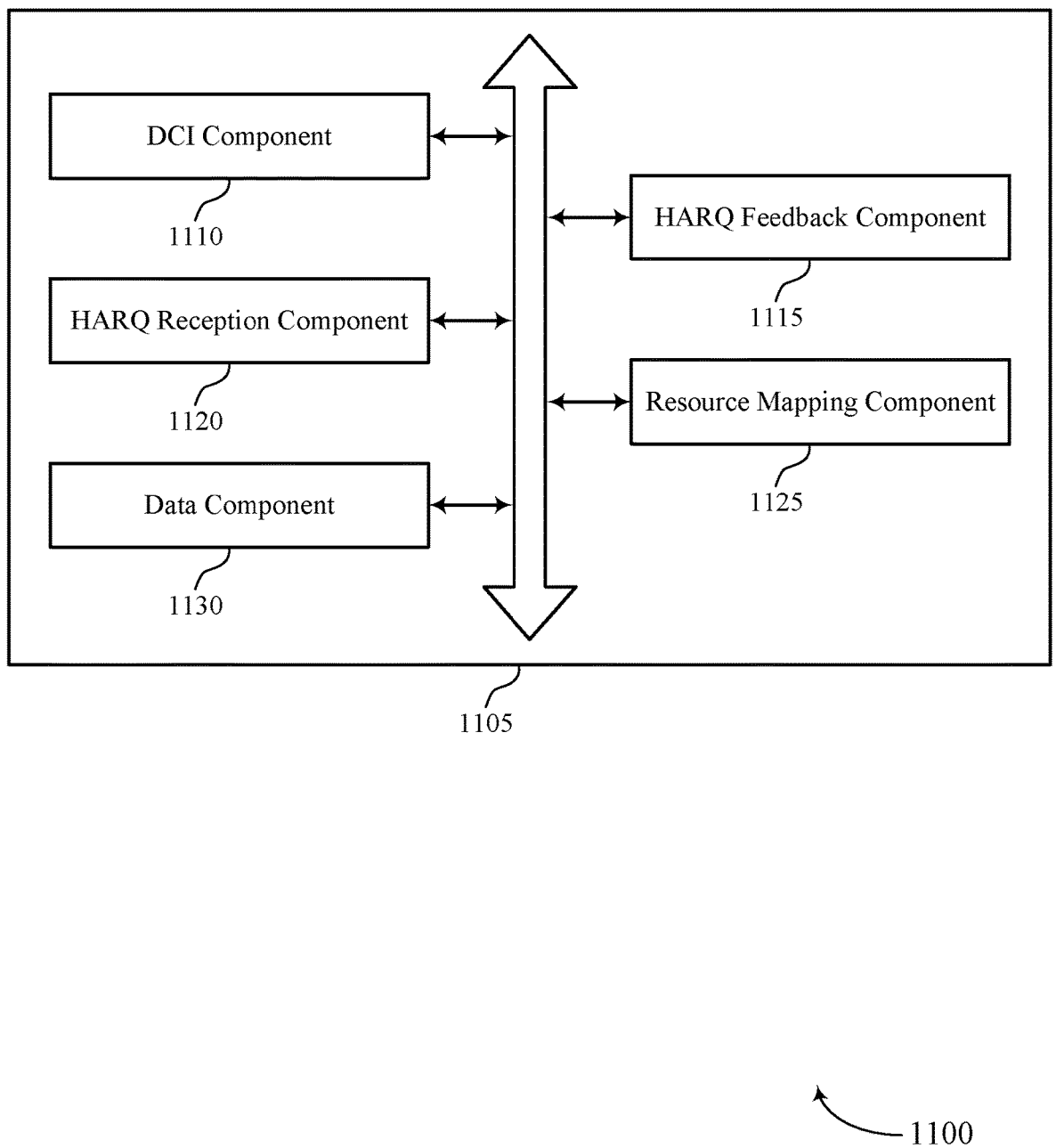
FIG. 11 shows a block diagram of a communications manager that supports identifying a HARQ mode in accordance with aspects of the present disclosure.

FIG. 11 shows a block diagram 1100 of a communications manager 1105 that supports identifying a HARQ mode in accordance with aspects of the present disclosure. The communications manager 1105 may be an example of aspects of a communications manager 915, a communications manager 1015, or a communications manager 1210 described herein. The communications manager 1105 may include a DCI component 1110, a HARQ feedback component 1115, a HARQ reception component 1120, a resource mapping component 1125, and a data component 1130. Each of these modules may communicate, directly or indirectly, with one another (e.g., via one or more buses).

The DCI component 1110 may transmit a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration. In some cases, the downlink control message includes an indicator that triggers a UE to report the channel information, an indication of a timing for the UE to transmit the channel information, an indication of an uplink control resource for transmitting the channel information, an indication of a power for transmitting the channel information, or any combination thereof.

The HARQ feedback component 1115 may determine to use the first mode for receiving the HARQ feedback and the channel information based on the downlink control message.

In some examples, the HARQ feedback component 1115 may set an indicator field in the downlink control message to indicate the first mode. In some examples, the HARQ feedback component 1115 may activate the first mode based on the indication.

In some examples, the HARQ feedback component 1115 may select a format of the downlink control message from a set of formats, where the format corresponds to the first mode. In some examples, the HARQ feedback component 1115 may activate the first mode based on selecting the format of the downlink control message.

The HARQ reception component 1120 may receive the HARQ feedback and the channel information according to the first mode. In some examples, the HARQ reception component 1120 may receive the HARQ feedback without the channel information over the first uplink control resource based on a successful decoding of the downlink data. In some examples, the HARQ reception component 1120 may receive the HARQ feedback and the channel information over the first uplink control resource based on an unsuccessful decoding of the downlink data.

In some examples, multiple values may correspond to multiple combinations of HARQ feedback and channel information, and the HARQ reception component 1120 may receive, based on determining to use the first mode, one of the set of values based on a decoding of a data transmission scheduled by the downlink control message and a measurement of a channel condition, where the received HARQ feedback and the received channel information includes the one of the set of values.

The resource mapping component 1125 may schedule an uplink control resource based on determining to use the first mode, where the HARQ feedback and channel information are received in the uplink control resource. In some examples, the resource mapping component 1125 may schedule a set of uplink control resources based on determining to use the first mode, where the HARQ feedback is received in a first uplink control resource of the set of uplink control resources and the channel information is received in a second uplink control resource of the set of uplink control resources that occurs after the first uplink control resource. In some examples, the resource mapping component 1125 may schedule a set of uplink control resources based on determining to use the first mode, where a first uplink control resource of the set of uplink control resources is configured for transmissions of HARQ feedback and a second uplink control resource of the set of uplink control resources is configured for transmissions of bundled HARQ feedback and channel information.

The data component 1130 may transmit downlink data based on the downlink control message.

Figure 12:
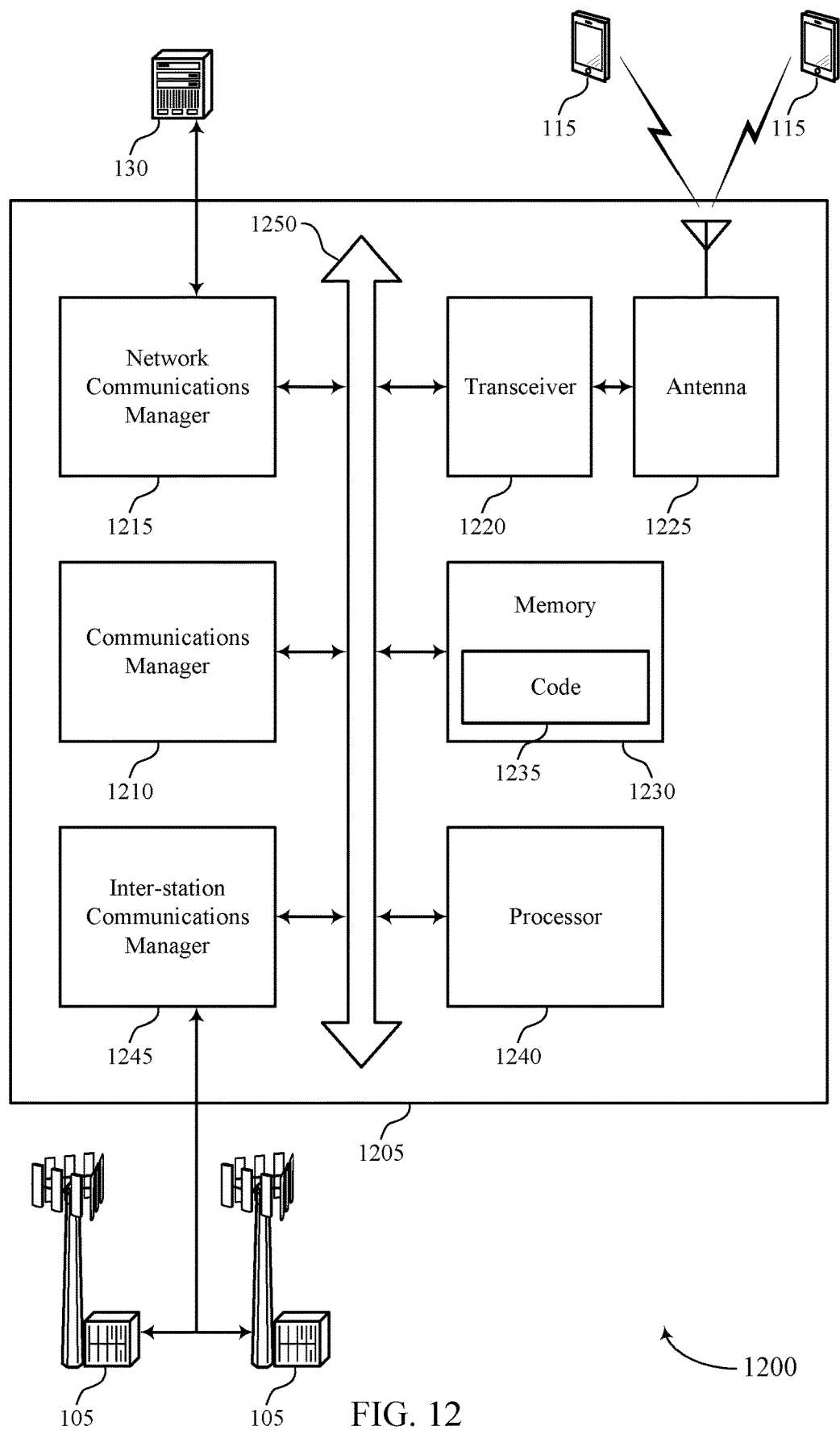
FIG. 12 shows a diagram of a system including a device that supports identifying a HARQ mode in accordance with aspects of the present disclosure.

FIG. 12 shows a diagram of a system 1200 including a device 1205 that supports identifying a HARQ mode in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration, determine to use the first mode for receiving the HARQ feedback and the channel information based on the downlink control message, and receive the HARQ feedback and the channel information according to the first mode.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting identifying a HARQ mode).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
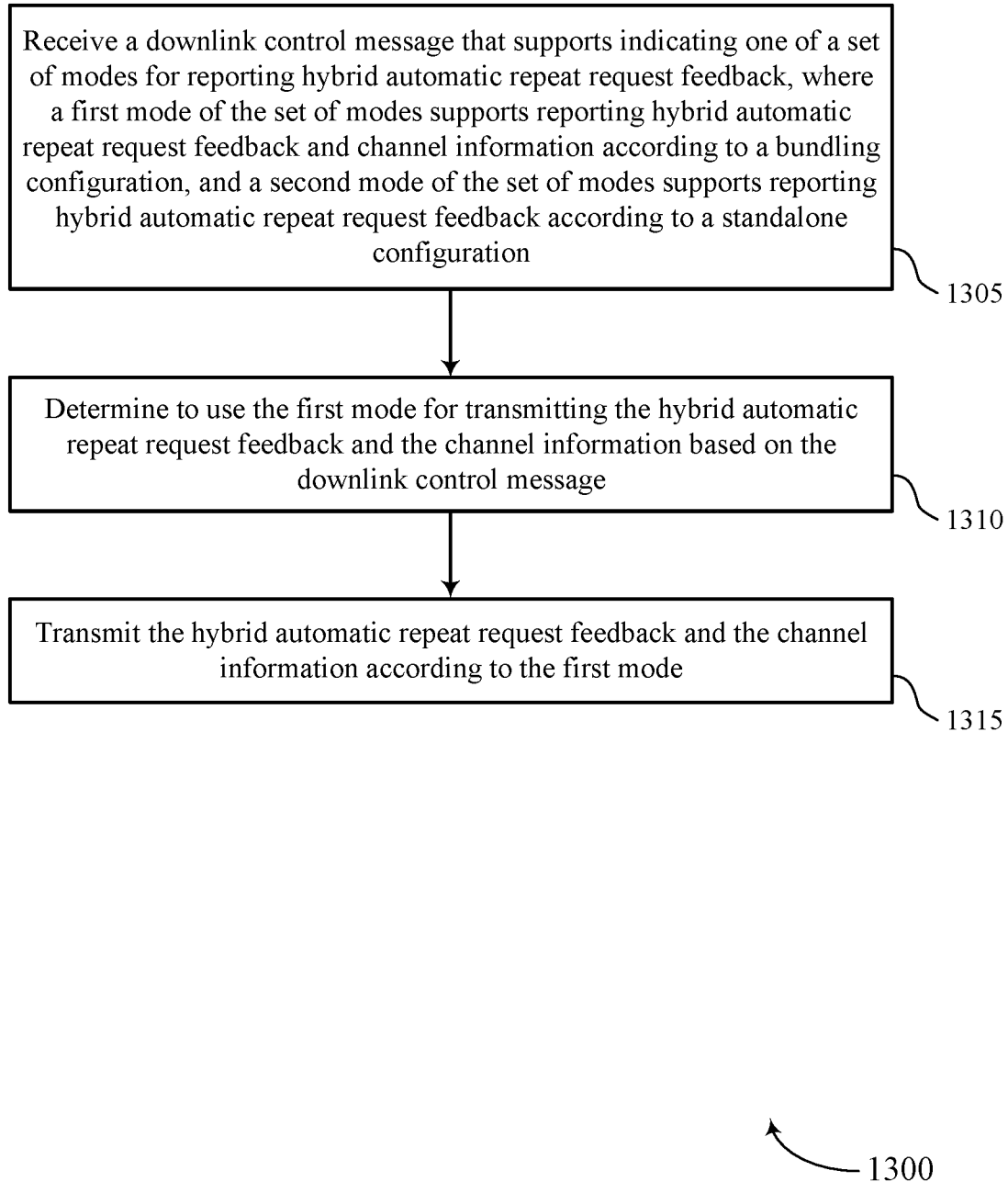
FIGS. 13 and 14 show flowcharts illustrating methods that support identifying a HARQ mode in accordance with aspects of the present disclosure.

FIG. 13 shows a flowchart illustrating a method 1300 that supports identifying a HARQ mode in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration. The operations of 1305 may be performed according to the methods described herein. In some examples, aspects of the operations of 1305 may be performed by a DCI component as described with reference to FIGS. 5 through 8.

At 1310, the UE may determine to use the first mode for transmitting the HARQ feedback and the channel information based on the downlink control message. The operations of 1310 may be performed according to the methods described herein. In some examples, aspects of the operations of 1310 may be performed by a HARQ feedback component as described with reference to FIGS. 5 through 8.

At 1315, the UE may transmit the HARQ feedback and the channel information according to the first mode. The operations of 1315 may be performed according to the methods described herein. In some examples, aspects of the operations of 1315 may be performed by a HARQ reporting component as described with reference to FIGS. 5 through 8.

Figure 14:
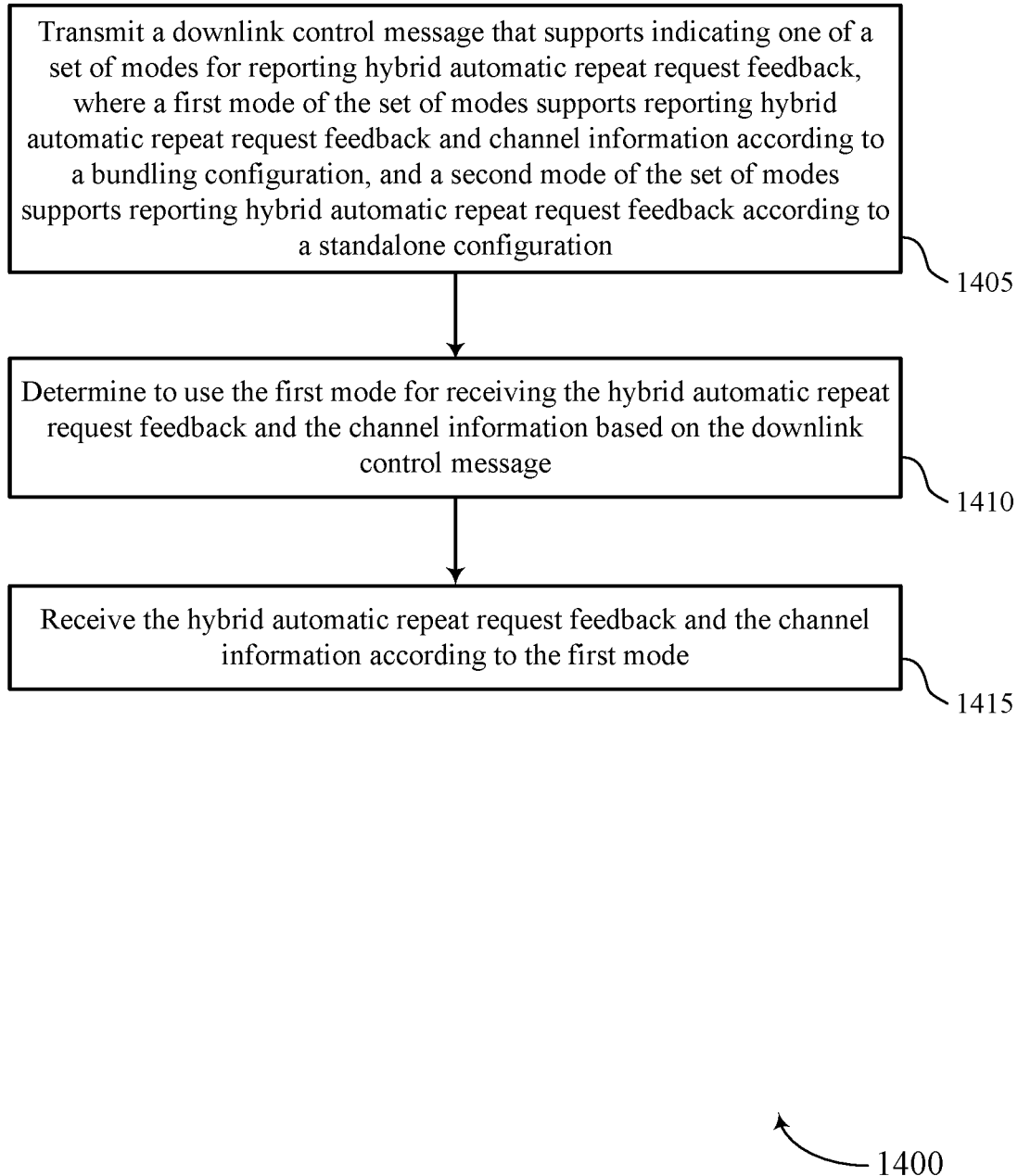

FIG. 14 shows a flowchart illustrating a method 1400 that supports identifying a HARQ mode in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1405, the base station may transmit a downlink control message that supports indicating one of a set of modes for reporting HARQ feedback, where a first mode of the set of modes supports reporting HARQ feedback and channel information according to a bundling configuration, and a second mode of the set of modes supports reporting HARQ feedback according to a standalone configuration. The operations of 1405 may be performed according to the methods described herein. In some examples, aspects of the operations of 1405 may be performed by a DCI component as described with reference to FIGS. 9 through 12.

At 1410, the base station may determine to use the first mode for receiving the HARQ feedback and the channel information based on the downlink control message. The operations of 1410 may be performed according to the methods described herein. In some examples, aspects of the operations of 1410 may be performed by a HARQ feedback component as described with reference to FIGS. 9 through 12.

At 1415, the base station may receive the HARQ feedback and the channel information according to the first mode. The operations of 1415 may be performed according to the methods described herein. In some examples, aspects of the operations of 1415 may be performed by a HARQ reception component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a downlink control message that supports indicating one of a plurality of modes for reporting hybrid automatic repeat request feedback, wherein a first mode of the plurality of modes supports reporting hybrid automatic repeat request feedback and channel information according to a bundling configuration, and a second mode of the plurality of modes supports reporting hybrid automatic repeat request feedback according to a standalone configuration; determining to use the first mode for transmitting the hybrid automatic repeat request feedback and the channel information based at least in part on the downlink control message; and transmitting the hybrid automatic repeat request feedback and the channel information according to the first mode.

Aspect 2: The method of aspect 1, further comprising: bundling the hybrid automatic repeat request feedback with the channel information based at least in part on determining to use the first mode, wherein the hybrid automatic repeat request feedback and the channel information are transmitted after the bundling.

Aspect 3: The method of any of aspects 1 through 2, further comprising: identifying a channel state information reference signal resource based at least in part on an indication of the channel state information reference signal resource included in the downlink control message, wherein the channel information is determined based at least in part on the channel state information reference signal resource.

Aspect 4: The method of any of aspects 1 through 3, further comprising: identifying an uplink control resource based at least in part on determining to use the first mode, wherein the hybrid automatic repeat request feedback and the channel information are transmitted in the uplink control resource.

Aspect 5: The method of any of aspects 1 through 4, further comprising: identifying a plurality of uplink control resources based at least in part on determining to use the first mode, wherein the hybrid automatic repeat request feedback is transmitted in a first uplink control resource of the plurality of uplink control resources and the channel information is transmitted in a second uplink control resource of the plurality of uplink control resources.

Aspect 6: The method of aspect 5, wherein the downlink control message comprises an indicator that triggers the UE to report the channel information, an indication of a timing for transmitting the channel information, an indication of an uplink control resource for transmitting the channel information, an indication of a power for transmitting the channel information, or any combination thereof.

Aspect 7: The method of any of aspects 1 through 6, further comprising: receiving a downlink data transmission based at least in part on the downlink control message; determining that a decoding of the downlink data transmission was successful; and refraining from bundling the hybrid automatic repeat request feedback with the channel information based at least in part on the decoding being successful, wherein transmitting the hybrid automatic repeat request feedback and the channel information comprises transmitting the hybrid automatic repeat request feedback without the channel information.

Aspect 8: The method of aspect 7, further comprising: identifying a plurality of uplink control resources based at least in part on determining to use the first mode, wherein a first uplink control resource of the plurality of uplink control resources is configured for transmissions of hybrid automatic repeat request feedback and a second uplink control resource of the plurality of uplink control resources is configured for transmissions of bundled hybrid automatic repeat request feedback and channel information.

Aspect 9: The method of any of aspects 1 through 8, further comprising: receiving a downlink data transmission based at least in part on the downlink control message; determining that a decoding of the downlink data transmission was unsuccessful; and bundling the hybrid automatic repeat request feedback with the channel information based at least in part on the decoding being unsuccessful.

Aspect 10: The method of aspect 9, further comprising: identifying a plurality of uplink control resources based at least in part on determining to use the first mode, wherein a first uplink control resource of the plurality of uplink control resources is configured for transmissions of hybrid automatic repeat request feedback and a second uplink control resource of the plurality of uplink control resources is configured for transmissions of bundled hybrid automatic repeat request feedback and channel information.

Aspect 11: The method of aspect 10, wherein the hybrid automatic repeat request feedback and channel information is transmitted over the second uplink control resource based at least in part on the decoding being unsuccessful.

Aspect 12: The method of any of aspects 1 through 11, wherein a plurality of values correspond to a plurality of combinations of hybrid automatic repeat request feedback and channel information, the method further comprising: selecting, based at least in part on determining to use the first mode, one of the plurality of values based at least in part on a decoding of a data transmission scheduled by the downlink control message and a measurement of a channel condition, wherein the transmitted hybrid automatic repeat request feedback and the transmitted channel information comprises the selected one of the plurality of values.

Aspect 13: The method of aspect 12, wherein determining a first value of a channel quality indicator, wherein the data transmission is based at least in part on the first value; failing to decode the data transmission; and determining a second value of the channel quality indicator, wherein the one of the plurality of values is selected based at least in part on a difference between the first value and the second value.

Aspect 14: The method of aspect 13, wherein the second value of the channel quality indicator is based at least in part on a signal strength for the data transmission.

Aspect 15: The method of any of aspects 12 through 14, wherein a first value of the plurality of values corresponds to a successful decoding of the data transmission; a second value of the plurality of values corresponds to an unsuccessful decoding of the data transmission and a first channel measurement; a third value of the plurality of values corresponds to the unsuccessful decoding of the data transmission and a second channel measurement; and a fourth value of the plurality of values corresponds to the unsuccessful decoding of the data transmission and a third channel measurement.

Aspect 16: The method of aspect 15, wherein the second value corresponds to a missed downlink control message.

Aspect 17: The method of any of aspects 12 through 16, wherein a first value of the plurality of values corresponds to an unsuccessful decoding of the data transmission and a first channel measurement; a second value of the plurality of values corresponds to the unsuccessful decoding of the data transmission and a second channel measurement; a third value of the plurality of values corresponds to the unsuccessful decoding of the data transmission and a third channel measurement; and a fourth value of the plurality of values corresponds to the unsuccessful decoding of the data transmission and a fourth channel measurement.

Aspect 18: The method of aspect 17, wherein the first value corresponds to a missed downlink control message.

Aspect 19: The method of any of aspects 12 through 18, wherein a first value of the plurality of values corresponds to a successful decoding of the data transmission; a second value of the plurality of values corresponds to an unsuccessful decoding of the data transmission; and a third value of the plurality of values corresponds to a missed downlink control message.

Aspect 20: The method of aspect 19, wherein a fourth value of the plurality of values corresponds to the unsuccessful decoding of the data transmission and a first channel measurement.

Aspect 21: The method of any of aspects 1 through 20, wherein the determining comprises: decoding an indicator field in the downlink control message, the indicator field comprising an indication of the first mode; and activating the first mode based at least in part on the indication.

Aspect 22: The method of aspect 21, further comprising: receiving a second downlink control message that supports indicating one of the plurality of modes for reporting hybrid automatic repeat request feedback; decoding the indicator field in the second downlink control message, the indicator field comprising a second indication of the second mode; activating the second mode based at least in part on the second indication; and transmitting second hybrid automatic repeat request feedback according to the second mode.

Aspect 23: The method of any of aspects 1 through 22, wherein the determining comprises: identifying a format of the downlink control message; determining that the format of the downlink control message corresponds to the first mode; and activating the first mode based at least in part on the format of the downlink control message.

Aspect 24: The method of aspect 23, further comprising: receiving a second downlink control message that supports indicating one of the plurality of modes for reporting hybrid automatic repeat request feedback; determining that a second format of the second downlink control message corresponds to the second mode; activating the second mode based at least in part on the format of the second downlink control message; and transmitting second hybrid automatic repeat request feedback according to the second mode.

Aspect 25: The method of any of aspects 1 through 24, wherein the determining comprises: receiving a radio resource control message; decoding an indicator field in the radio resource control message, the indicator field comprising an indication of the first mode; and activating the first mode based at least in part on the indication.

Aspect 26: A method for wireless communications at a base station, comprising: transmitting a downlink control message that supports indicating one of a plurality of modes for reporting hybrid automatic repeat request feedback, wherein a first mode of the plurality of modes supports reporting hybrid automatic repeat request feedback and channel information according to a bundling configuration, and a second mode of the plurality of modes supports reporting hybrid automatic repeat request feedback according to a standalone configuration; determining to use the first mode for receiving the hybrid automatic repeat request feedback and the channel information based at least in part on the downlink control message; and receiving the hybrid automatic repeat request feedback and the channel information according to the first mode.

Aspect 27: The method of aspect 26, further comprising: scheduling an uplink control resource based at least in part on determining to use the first mode, wherein the hybrid automatic repeat request feedback and channel information are received in the uplink control resource.

Aspect 28: The method of any of aspects 26 through 27, further comprising: scheduling a plurality of uplink control resources based at least in part on determining to use the first mode, wherein the hybrid automatic repeat request feedback is received in a first uplink control resource of the plurality of uplink control resources and the channel information is received in a second uplink control resource of the plurality of uplink control resources that occurs after the first uplink control resource.

Aspect 29: The method of aspect 28, wherein the downlink control message comprises an indicator that triggers a UE to report the channel information, an indication of a timing for the UE to transmit the channel information, an indication of an uplink control resource for transmitting the channel information, an indication of a power for transmitting the channel information, or any combination thereof.

Aspect 30: The method of any of aspects 26 through 29, further comprising: scheduling a plurality of uplink control resources based at least in part on determining to use the first mode, wherein a first uplink control resource of the plurality of uplink control resources is configured for transmissions of hybrid automatic repeat request feedback and a second uplink control resource of the plurality of uplink control resources is configured for transmissions of bundled hybrid automatic repeat request feedback and channel information.

Aspect 31: The method of aspect 30, further comprising: transmitting downlink data based at least in part on the downlink control message; and receiving the hybrid automatic repeat request feedback without the channel information over the first uplink control resource based at least in part on a successful decoding of the downlink data.

Aspect 32: The method of any of aspects 30 through 31, further comprising: transmitting downlink data based at least in part on the downlink control message; and receiving the hybrid automatic repeat request feedback and the channel information over the first uplink control resource based at least in part on an unsuccessful decoding of the downlink data.

Aspect 33: The method of any of aspects 26 through 32, wherein a plurality of values correspond to a plurality of combinations of hybrid automatic repeat request feedback and channel information, the method further comprising: receiving, based at least in part on determining to use the first mode, one of the plurality of values based at least in part on a decoding of a data transmission scheduled by the downlink control message and a measurement of a channel condition, wherein the received hybrid automatic repeat request feedback and the received channel information comprises the one of the plurality of values.

Aspect 34: The method of any of aspects 26 through 33, further comprising. setting an indicator field in the downlink control message to indicate the first mode; and activating the first mode based at least in part on the indication.

Aspect 35: The method of any of aspects 26 through 34, further comprising: selecting a format of the downlink control message from a plurality of formats, wherein the format corresponds to the first mode; and activating the first mode based at least in part on selecting the format of the downlink control message.

Aspect 36: An apparatus for wireless communications at a UE, comprising a processor; memory coupled with the processor; and instructions stored in the memory and executable by the processor to cause the apparatus to perform a method of any of aspects 1 through 25.

Aspect 37: An apparatus for wireless communications at a UE, comprising at least one means for performing a method of any of aspects 1 through 25.

Aspect 38: A non-transitory computer-readable medium storing code for wireless communications at a UE, the code comprising instructions executable by a processor to perform a method of any of aspects 1 through 25.

Aspect 39: An apparatus for wireless communications at a base station, comprising a processor; memory coupled with the processor; and instructions stored in the memory and executable by the processor to cause the apparatus to perform a method of any of aspects 26 through 35.

Aspect 40: An apparatus for wireless communications at a base station, comprising at least one means for performing a method of any of aspects 26 through 35.

Aspect 41: A non-transitory computer-readable medium storing code for wireless communications at a base station, the code comprising instructions executable by a processor to perform a method of any of aspects 26 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a downlink control message that supports indicating one of a plurality of modes for reporting hybrid automatic repeat request feedback, wherein a first mode of the plurality of modes supports reporting hybrid automatic repeat request feedback and channel information according to a bundling configuration, and a second mode of the plurality of modes supports reporting hybrid automatic repeat request feedback according to a standalone configuration;
   determining to use the first mode for transmitting the hybrid automatic repeat request feedback and the channel information based at least in part on the downlink control message, wherein a plurality of values corresponds to a plurality of combinations of hybrid automatic repeat request feedback and channel information;
   determining a first index of a channel quality indicator or a modulation and coding scheme (MCS), wherein a data transmission is based at least in part on the first index;
   failing to decode the data transmission;
   determining a second index of the channel quality indicator or the MCS;
   selecting, based at least in part on determining to use the first mode, one of the plurality of values based at least in part on a difference between the first index and the second index; and
   transmitting the hybrid automatic repeat request feedback and the channel information according to the first mode, wherein the transmitted hybrid automatic repeat request feedback and the transmitted channel information comprises the selected one of the plurality of values.

2. The method of claim 1, further comprising:
   bundling the hybrid automatic repeat request feedback with the channel information based at least in part on determining to use the first mode, wherein the hybrid automatic repeat request feedback and the channel information are transmitted after the bundling.

3. The method of claim 1, further comprising:
   identifying a channel state information reference signal resource based at least in part on an indication of the channel state information reference signal resource included in the downlink control message, wherein the channel information is determined based at least in part on the channel state information reference signal resource.

4. The method of claim 1, further comprising:
   identifying an uplink control resource based at least in part on determining to use the first mode, wherein the hybrid automatic repeat request feedback and the channel information are transmitted in the uplink control resource.

5. The method of claim 1, further comprising:
   identifying a plurality of uplink control resources based at least in part on determining to use the first mode, wherein the hybrid automatic repeat request feedback is transmitted in a first uplink control resource of the plurality of uplink control resources and the channel information is transmitted in a second uplink control resource of the plurality of uplink control resources.

6. The method of claim 5, wherein the downlink control message comprises an indicator that triggers the UE to report the channel information, an indication of a timing for transmitting the channel information, an indication of an uplink control resource for transmitting the channel information, an indication of a power for transmitting the channel information, or any combination thereof.

7. The method of claim 1, further comprising:
   receiving a downlink data transmission based at least in part on the downlink control message;
   determining that a decoding of the downlink data transmission was successful; and
   refraining from bundling the hybrid automatic repeat request feedback with the channel information based at least in part on the decoding being successful, wherein transmitting the hybrid automatic repeat request feedback and the channel information comprises transmitting the hybrid automatic repeat request feedback without the channel information.

8. The method of claim 7, further comprising:
   identifying a plurality of uplink control resources based at least in part on determining to use the first mode, wherein a first uplink control resource of the plurality of uplink control resources is configured for transmissions of hybrid automatic repeat request feedback and a second uplink control resource of the plurality of uplink control resources is configured for transmissions of bundled hybrid automatic repeat request feedback and channel information.

9. The method of claim 1, further comprising:
   receiving a downlink data transmission based at least in part on the downlink control message;
   determining that a decoding of the downlink data transmission was unsuccessful; and
   bundling the hybrid automatic repeat request feedback with the channel information based at least in part on the decoding being unsuccessful.

10. The method of claim 9, further comprising:
    identifying a plurality of uplink control resources based at least in part on determining to use the first mode, wherein a first uplink control resource of the plurality of uplink control resources is configured for transmissions of hybrid automatic repeat request feedback and a second uplink control resource of the plurality of uplink control resources is configured for transmissions of bundled hybrid automatic repeat request feedback and channel information.

11. The method of claim 10, wherein the hybrid automatic repeat request feedback and channel information is transmitted over the second uplink control resource based at least in part on the decoding being unsuccessful.

12. The method of claim 1, wherein the second index of the channel quality indicator is based at least in part on a signal strength for the data transmission.

13. The method of claim 1, wherein:
a first value of the plurality of values corresponds to a successful decoding of the data transmission;
a second value of the plurality of values corresponds to an unsuccessful decoding of the data transmission and a first channel measurement;
a third value of the plurality of values corresponds to the unsuccessful decoding of the data transmission and a second channel measurement; and
a fourth value of the plurality of values corresponds to the unsuccessful decoding of the data transmission and a third channel measurement.

14. The method of claim 13, wherein the second value corresponds to a missed downlink control message.

15. The method of claim 1, wherein:
a first value of the plurality of values corresponds to an unsuccessful decoding of the data transmission and a first channel measurement;
a second value of the plurality of values corresponds to the unsuccessful decoding of the data transmission and a second channel measurement;
a third value of the plurality of values corresponds to the unsuccessful decoding of the data transmission and a third channel measurement; and
a fourth value of the plurality of values corresponds to the unsuccessful decoding of the data transmission and a fourth channel measurement.

16. The method of claim 15, wherein the first value corresponds to a missed downlink control message.

17. The method of claim 1, wherein:
a first value of the plurality of values corresponds to a successful decoding of the data transmission;
a second value of the plurality of values corresponds to an unsuccessful decoding of the data transmission; and
a third value of the plurality of values corresponds to a missed downlink control message.

18. The method of claim 17, wherein a fourth value of the plurality of values corresponds to the unsuccessful decoding of the data transmission and a first channel measurement.

19. The method of claim 1, wherein the determining comprises:
decoding an indicator field in the downlink control message, the indicator field comprising an indication of the first mode; and
activating the first mode based at least in part on the indication of the first mode.

20. The method of claim 19, further comprising:
receiving a second downlink control message that supports indicating one of the plurality of modes for reporting hybrid automatic repeat request feedback;
decoding the indicator field in the second downlink control message, the indicator field comprising a second indication of the second mode;
activating the second mode based at least in part on the second indication; and
transmitting second hybrid automatic repeat request feedback according to the second mode.

21. The method of claim 1, wherein the determining comprises:
identifying a format of the downlink control message;
determining that the format of the downlink control message corresponds to the first mode; and
activating the first mode based at least in part on the format of the downlink control message.

22. The method of claim 21, further comprising:
receiving a second downlink control message that supports indicating one of the plurality of modes for reporting hybrid automatic repeat request feedback;
determining that a second format of the second downlink control message corresponds to the second mode;
activating the second mode based at least in part on the format of the second downlink control message; and
transmitting second hybrid automatic repeat request feedback according to the second mode.

23. The method of claim 1, wherein the determining comprises:
receiving a radio resource control message;
decoding an indicator field in the radio resource control message, the indicator field comprising an indication of the first mode; and
activating the first mode based at least in part on the indication of the first mode.

24. A method for wireless communications at an access network entity, comprising:
transmitting a downlink control message that supports indicating one of a plurality of modes for reporting hybrid automatic repeat request feedback, wherein a first mode of the plurality of modes supports reporting hybrid automatic repeat request feedback and channel information according to a bundling configuration, and a second mode of the plurality of modes supports reporting hybrid automatic repeat request feedback according to a standalone configuration;
determining to use the first mode for receiving the hybrid automatic repeat request feedback and the channel information based at least in part on the downlink control message; and
receiving, based at least in part on the first mode being indicated by the downlink control message, the hybrid automatic repeat request feedback and the channel information according to the first mode, wherein the received hybrid automatic repeat request feedback and the channel information comprises a value of a plurality of values corresponding to a plurality of combinations of hybrid automatic repeat request feedback and channel information, wherein the value is based at least in part on a difference between a first index of a channel quality indicator or a modulation and coding scheme (MCS) associated with a data transmission and a second index of the channel quality indicator or the MCS measured after a decoding failure for the data transmission.

25. The method of claim 24, further comprising:
scheduling a plurality of uplink control resources based at least in part on determining to use the first mode, wherein the hybrid automatic repeat request feedback is received in a first uplink control resource of the plurality of uplink control resources and the channel information is received in a second uplink control resource of the plurality of uplink control resources that occurs after the first uplink control resource,
wherein the downlink control message comprises an indicator that triggers a user equipment (UE) to report the channel information, an indication of a timing for the UE to transmit the channel information, an indication of an uplink control resource for transmitting the channel information, an indication of a power for transmitting the channel information, or any combination thereof.

26. The method of claim 24, further comprising:
setting an indicator field in the downlink control message to indicate the first mode; and
activating the first mode based at least in part on the indication.

27. An apparatus for wireless communications at a user equipment (UE), comprising:
a processor,
memory coupled with the processor; and
instructions stored in the memory and executable by the processor to cause the apparatus to:
receive a downlink control message that supports indicating one of a plurality of modes for reporting hybrid automatic repeat request feedback, wherein a first mode of the plurality of modes supports reporting hybrid automatic repeat request feedback and channel information according to a bundling configuration, and a second mode of the plurality of modes supports reporting hybrid automatic repeat request feedback according to a standalone configuration;
determine to use the first mode for transmitting the hybrid automatic repeat request feedback and the channel information based at least in part on the downlink control message, wherein a plurality of values corresponds to a plurality of combinations of hybrid automatic repeat request feedback and channel information;
determine a first index of a channel quality indicator or a modulation and coding scheme (MCS), wherein a data transmission is based at least in part on the first index;
fail to decode the data transmission;
determine a second index of the channel quality indicator or the MCS;
select, based at least in part on determining to use the first mode, one of the plurality of values based at least in part on a difference between the first index and the second index; and
transmit the hybrid automatic repeat request feedback and the channel information according to the first mode, wherein the transmitted hybrid automatic repeat request feedback and the transmitted channel information comprises the selected one of the plurality of values.

28. An apparatus for wireless communications at an access network entity, comprising:
a processor,
memory coupled with the processor; and
instructions stored in the memory and executable by the processor to cause the apparatus to:
transmit a downlink control message that supports indicating one of a plurality of modes for reporting hybrid automatic repeat request feedback, wherein a first mode of the plurality of modes supports reporting hybrid automatic repeat request feedback and channel information according to a bundling configuration, and a second mode of the plurality of modes supports reporting hybrid automatic repeat request feedback according to a standalone configuration;
determine to use the first mode for receiving the hybrid automatic repeat request feedback and the channel information based at least in part on the downlink control message; and
receive, based at least in part on the first mode being indicated by the downlink control message, the hybrid automatic repeat request feedback and the channel information according to the first mode, wherein the received hybrid automatic repeat request feedback and the channel information comprises a value of a plurality of values corresponding to a plurality of combinations of hybrid automatic repeat request feedback and channel information, wherein the value is based at least in part on a difference between a first index of a channel quality indicator or a modulation and coding scheme (MCS) associated with a data transmission and a second index of the channel quality indicator or the MCS measured after a decoding failure for the data transmission.

\* \* \* \* \*